(12) United States Patent
Takahashi

(10) Patent No.: US 6,864,991 B1
(45) Date of Patent: Mar. 8, 2005

(54) INFORMATION PROCESSING APPARATUS FOR DISPLAYING DATA RELATED TO IMAGE FORMING APPARATUS, AND INFORMATION PROCESSING METHOD THEREFOR

(75) Inventor: Hiroyuki Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/498,627

(22) Filed: Feb. 7, 2000

(30) Foreign Application Priority Data

Feb. 9, 1999 (JP) .......................................... 11-031769

(51) Int. Cl.[7] .............................. G06F 15/00; G06F 3/00
(52) U.S. Cl. ......................... 358/1.15; 710/19; 710/20
(58) Field of Search ................. 358/1.15, 1.9, 358/1.13, 1.18; 710/19, 20

(56) References Cited

U.S. PATENT DOCUMENTS 6,469,796 B1 * 10/2002 Leiman et al. ............. 358/1.15

* cited by examiner

Primary Examiner—Kimberly Williams
Assistant Examiner—Saeid Ebrahimi
(74) Attorney, Agent, or Firm—Fitzpatrick, Cella, Harper & Scinto

(57) ABSTRACT

According to the present invention, data for all or a part of the MFP devices connected to a network are obtained, and are rearranged as a list or are limited based on a variety of data obtained for each device, such as equipment data, apparatus data, network setup data, job states and employment statuses. As a result, data desired by a user can be provided in real time.

35 Claims, 39 Drawing Sheets

FIG. 13

DEVICE/SORTING/SPEED/RANKING

● SPEED RANKING

| NO | NAME | MF | PLACE | SPEED | JAM/ERR | PRICE | DATE |
|---|---|---|---|---|---|---|---|
| #01 | MELON | 09 | 3F-A2 | 50 | 0.11% | ¥0.12 | 97.12.06 |
| #02 | LEMON | 11 | 2F-B1 | 45 | 0.22% | ¥0.10 | 96.08.22 |
| #03 | ORANGE | 03 | 3F-B3 | 42 | 1.50% | ¥5.32 | 94.03.31 |
| #04 | APPLE | 07 | 2F-A3 | 40 | 0.04% | ¥0.12 | 92.09.03 |
| #05 | BANANA | 22 | 3F-C3 | 30 | 2.28% | ¥0.54 | 97.11.30 |

GRAPH  MAP  INFO.  SELECT  PREV.  NEXT  BACK

FIG. 17

DEVICE/SELECTING/COLOR MACHINE

● COLOR MACHINES

| NO | NAME | MF | PLACE | SPEED | JAM/ERR | PRICE | DATE |
|---|---|---|---|---|---|---|---|
| #01 | MELON2 | 09 | 3F-A2 | 50 | 0.11% | ¥ 0.12 | 97.12.06 |
| #04 | APPLE22 | 07 | 2F-A3 | 40 | 0.04% | ¥ 0.12 | 97.09.03 |
| #05 | BANANA1 | 22 | 3F-C3 | 30 | 2.28% | ¥ 0.54 | 97.11.30 |

[GRAPH] [MAP] [INFO.] [SELECT] [PREV.] [NEXT] [BACK]

FIG. 19

STATUS/SORTING/MORE FAVORITE/RANKING

● MORE FAVORITE RANKING 1904 1905 1906
1902  1903

| NO | NAME | STATUS | JAM/ERR | SERVICE CALL | POWER OFF |
|---|---|---|---|---|---|
| #01 | RABBIT | DEVICE READY | | | |
| #02 | LION | DEVICE NOT READY | | | x |
| #03 | SNAKE | DEVICE READY | | | |
| #04 | FOX | DEVICE READY | | | |
| #05 | MONKEY | DEVICE NOT READY | x | | |

[MAP] [INFO.] [SELECT] [PREV.] [NEXT] [BACK]

STATUS/SELECTING/WORKING

● WORKING

| NO | NAME | PLACE | SPEED | JAM/ERR | PRICE | DATE |
|---|---|---|---|---|---|---|
| #01 | RABBIT | 3F-A2 | 7 | 0.10% | ¥0.12 | 97.12.06 |
| #03 | SNAKE | 3F-B3 | 20 | 0.12% | ¥0.34 | 92.09.03 |
| #04 | FOX | 2F-A3 | 8 | 2.05% | ¥0.86 | 97.11.30 |
| #06 | GIRAFFE | 1F-C3 | 35 | 0.15% | ¥1.21 | 97.02.04 |

RANKING  INFO.  SELECT  PREV.  NEXT  BACK

FIG. 24

QUEUES/SORTING/NEARER/RANKING

● NEARER RANKING

| NO | NAME | STATUS | RIP QUEUE | PRINTING QUEUE | DIRECT | WAITING TIME |
|---|---|---|---|---|---|---|
| #03 | PARIS | DEVICE READY | 7 | 4 | 1 | 5 |
| #01 | CHICAGO | DEVICE READY | 12 | 0 | 0 | 5 |
| #05 | TOKYO | DEVICE READY | 0 | 0 | 23 | 11 |
| #02 | LONDON | DEVICE READY | 0 | 0 | 0 | 0 |
| #04 | ROME | DEVICE READY | 0 | 6 | 0 | 3 |

MAP  INFO.  SELECT  PREV.  NEXT  BACK

FIG. 26

DEVICE#03 INFORMATION
03 PARIS:

| NO | NAME | RIP QUEUE | PRINTING QUEUE | DIRECT | WAITING TIME |
|---|---|---|---|---|---|
| #01 | JENNIFER | 7 | 4 | 1 | 5 |
| #02 | DENIS | 12 | 0 | 0 | 5 |
| #03 | NAOMI | 0 | 0 | 23 | 11 |
| #04 | MICHAEL | 0 | 0 | 0 | 0 |

☐ STATUS/SORTING/NEARER/INFORMATION
● DEVICE#01 INFORMATION
● DEVICE#05 INFORMATION
● DEVICE#02 INFORMATION

BACK

FIG. 28

| NO | NAME | SORT | STAPLE | COLLATE | GROUP | PUNCH | SADDLE STECH | ZFOLD | INSERT |
|---|---|---|---|---|---|---|---|---|---|
| #01 | TUNA | × | × | × | | | | | |
| #02 | SHRIMP | × | × | × | × | × | × | × | × |
| #03 | SHARK | × | × | | | | | | |
| #04 | SQUID | | × | | | | | × | |
| #05 | OCTPUS | × | × | × | × | | | | |

CONFIG/SELECTING/FINISHER/RANKING

● FINISHER

[MAP] [INFO.] [SELECT] [PREV.] [NEXT] [BACK]

FIG. 30

CONFIG/SELECTING/FINISHER/RANKING

● MEDIA TYPE

| NO | NAME | ETHERNET 10MBPS | ETHERNET 100MBPS | TOKENRING 4MBPS | TOKENRING 16MBPS |
|---|---|---|---|---|---|
| #01 | EAGLE | X | X | | |
| #02 | ALBATROSS | X | | X | |
| #03 | LARK | X | | | |
| #04 | PENGUIN | | X | X | |
| #05 | SWAN | | | X | X |

MAP | INFO. | SELECT | PREV. | NEXT | BACK

INFORMATION PROCESSING APPARATUS FOR DISPLAYING DATA RELATED TO IMAGE FORMING APPARATUS, AND INFORMATION PROCESSING METHOD THEREFOR

BACKGROUND OF THE INVENTION

1. Field of the Invention

The present invention relates to an information processing apparatus for displaying data for a plurality of image forming apparatuses connected to a network; and to a network system, an information processing method and an information processing program therefor.

2. Related Background Art

Conventionally, network utility software is well known and available for the control and the monitoring 4 of computers comprising a network. One type of such software enables one of the computers connected to a network (a server) to control and to manage the operation of all other computers (clients) attached to the network, and can obtain information concerning their components, their operating states, their setups, their job states and their employment levels.

Another network utility software provides means by which one of the image forming apparatuses on a network can be selected to perform printing, and by which information concerning the specified image forming apparatus, that is, equipment information, the state of the apparatus, the network set-up, the state of a job and the employment status of the apparatus, can be obtained.

Other network utility software is available with which a single parameter can provide for the simultaneous display of the same screen on a plurality of image forming apparatuses. However, no network utility software is available that has a user-friendly GUI (a graphics screen) whereby a part or all of the above information can be displayed so that it is immediately available to a user.

Furthermore, no utility software is available with which a plurality of image forming apparatuses can be ordered, rearranged, or searched for in accordance with parameters that are inherent to the apparatuses, or with parameters that represent the capabilities of the apparatuses.

SUMMARY OF THE INVENTION

To resolve the above shortcoming, it is one objective of the present invention to provide for the rearrangement of a plurality of networked image forming apparatuses into a desired order, in accordance with the intent of a user, to immediately search for a specified image forming apparatus, or to provide for a user, in real time, equipment information and the state of the specified image forming apparatus, the setup of a network, the state of a job and the employment status of the image forming apparatus.

BRIEF DESCRIPTION OF THE DRAWINGS

FIG. 13 is a diagram showing ranking screen 1 for the utility software;

FIG. 17 is a diagram showing sorting screen 1 for the utility software;

FIG. 19 is a diagram showing ranking screen 2 for the utility software;

FIG. 22 is a diagram showing sorting screen 2 for the utility software;

FIG. 24 is a diagram showing ranking screen 3 for the utility software;

FIG. 26 is a diagram showing multi-window screen 2 for the utility software;

FIG. 28 is a diagram showing ranking screen 4 for the utility software;

FIG. 30 is a diagram showing ranking screen 5 for the utility software;

DETAILED DESCRIPTION OF THE PREFERRED EMBODIMENTS

<Outline of System>

Figure 1:
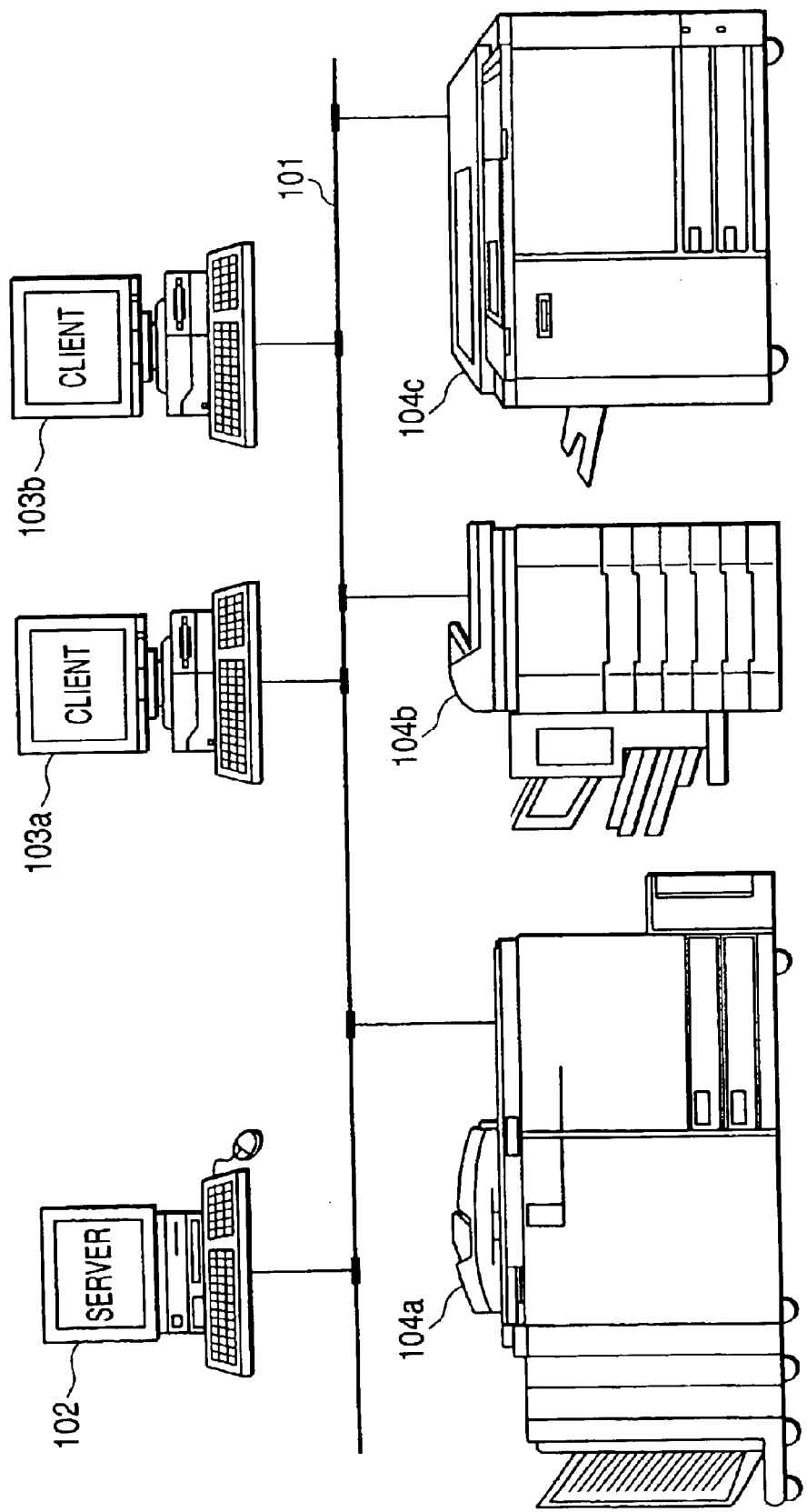
FIG. 1 is a diagram illustrating the external arrangement of a system according to one embodiment of the present invention.

FIG. 1 is a diagram showing the external arrangement of a network system according to the preferred embodiment of the present invention, and a plurality of network apparatuses that are connected to it. A computer 102 that is connected to the network 101 acts as a server, while a computer 103 that is connected to the network 101 serves as a client. Although in FIG. 1 several clients 103 are shown connected to the network 101, as indicated by the use of the numbers 103a and 103b, in the subsequent discussion "client 103" is used to represent all the clients.

A network apparatus 104 connected to the network 101 is a multi-purpose image forming apparatus called an MFP (multi-function peripheral). Once again, although in FIG. 1 several MFPs 104 are shown connected to the network, as indicated by the use of the numbers 104a, 104b and 104c, in the subsequent discussion "MFP 104" is used to represent all the MFPs. Note also that printers and facsimile machines (none of which are shown) may also be connected to the network 101.

So-called DTP (Desk Top Publishing) application software contains instructions for the operation of the computer 102 or 103, and can be used to create or to edit a variety of documents and graphics. The thus obtained documents or graphics are then translated into a PDL (Page Description Language) language, and the obtained data are transmitted via the network 101 to the MFP 104 for output therefrom.

The MFP 104 includes a communication interface for exchanging data with the computer 102 or 103 via the network 101. And each time data are transmitted to the computer 102 or 103, information concerning the composition and the operating state of the MFP 104 is transmitted with it. Thereafter, when such information is received, the utility software available at the computer 102 or 103 is activated to provide uniform management services for the MFP 104 (104a, 104b, 104c, ...).

Figure 36:
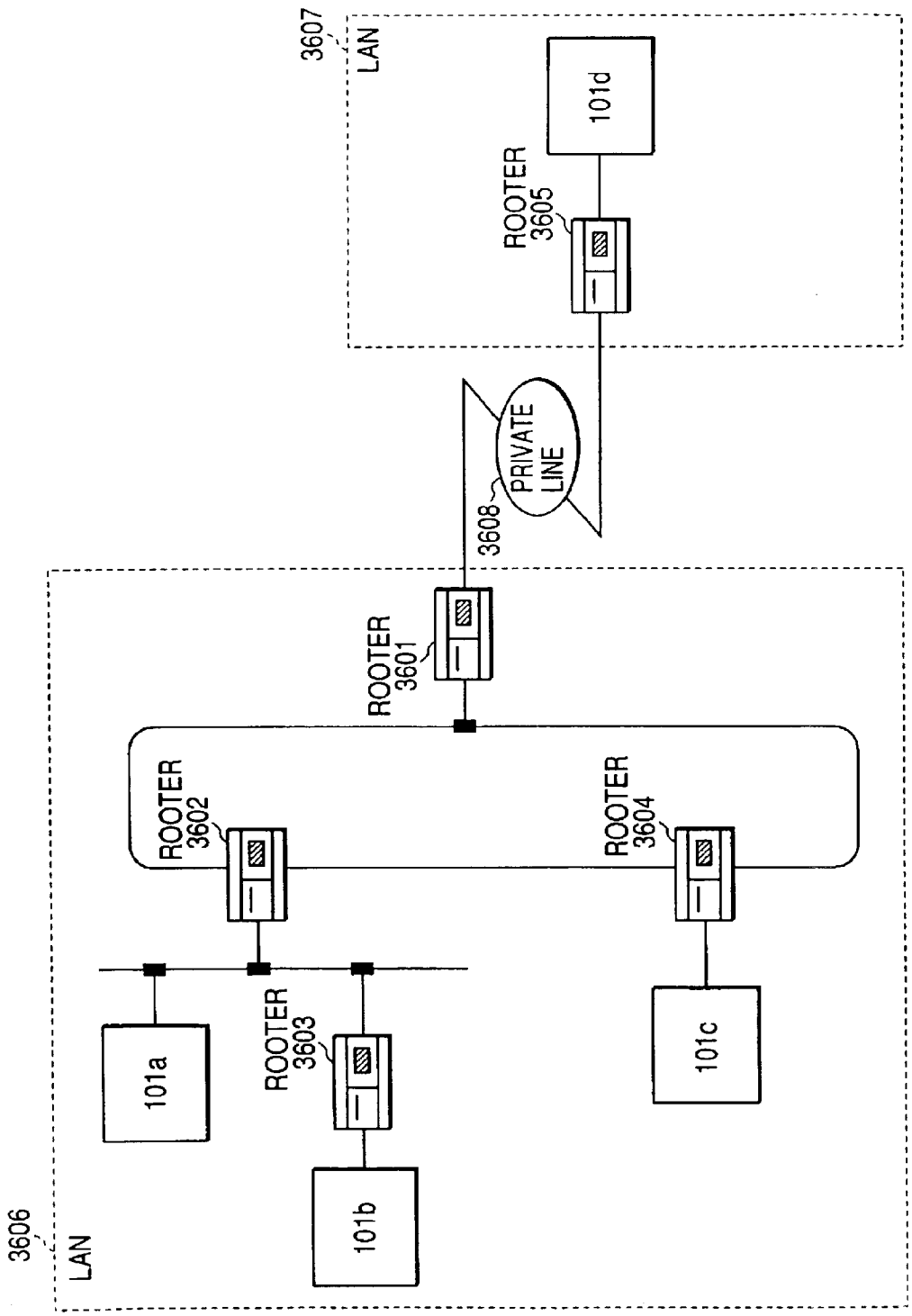
FIG. 36 is a diagram showing an example network that employs routers.

The network 101 shown in FIG. 1 may actually be a network such as is shown in FIG. 36. In the network in FIG. 36, a plurality of routers 3601 to 3604 constitute a first LAN (Local Area Network) 3606, and a router 3205 constitutes a second LAN 3607. The first LAN 3606 and the second LAN 3607 are interconnected via a private line 3208.

Figure 37:
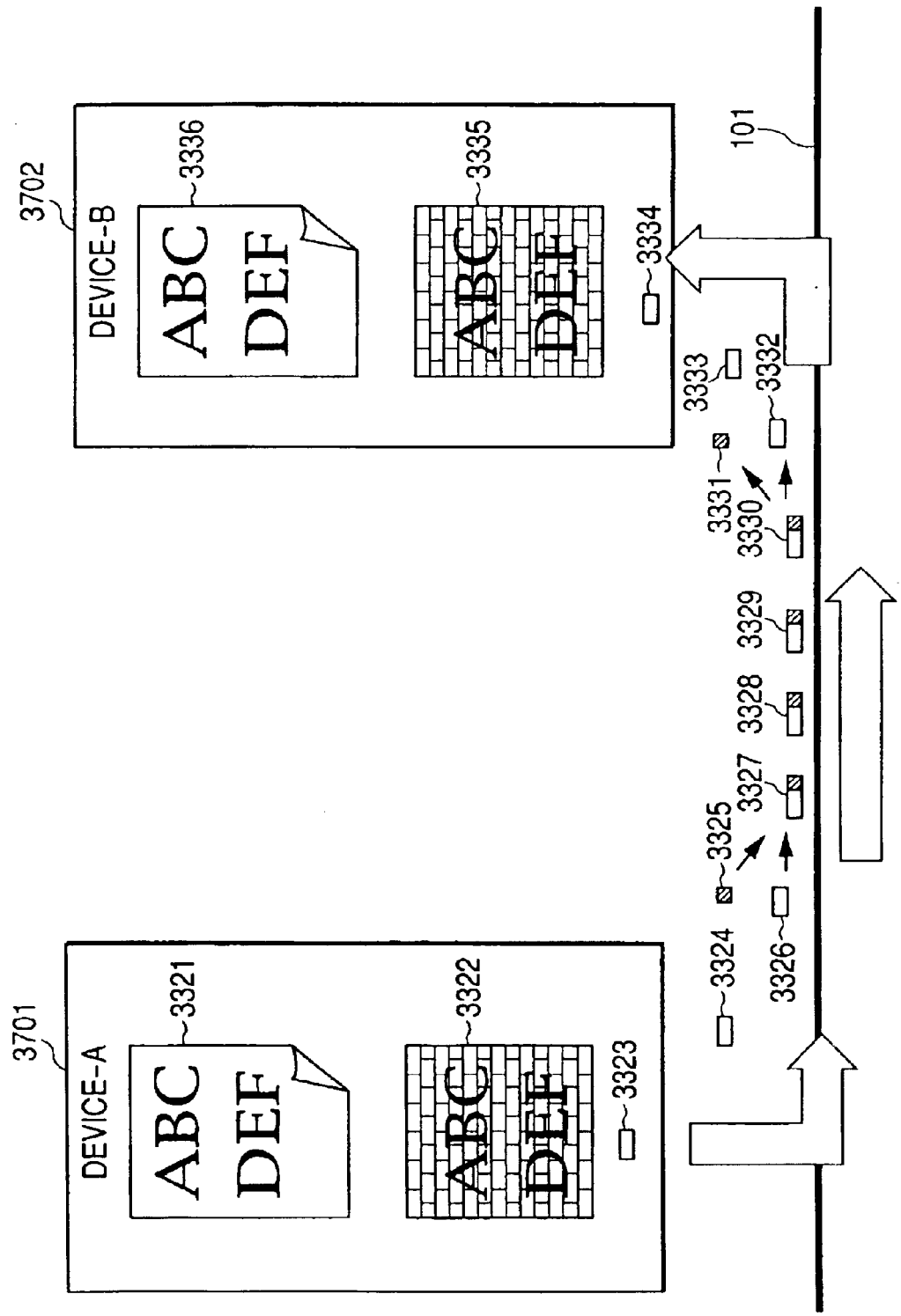
FIG. 37 is a diagram showing the exchange of data using packets.

The transmission route along which data 3321 are exchanged by devices on the network is shown in FIG. 37. Regardless of whether the data 3321 are image data, PDL data or program data, when they are to be transmitted by a transmission source device 3701 (device A), they are first divided to form a set 3322 composed of data segments. Then, as shown in FIG. 37, packets 3327 and 3330 are generated by adding a header 3325 to data segments 3323, 3324 and 3326 of the set 3322, and are sequentially transmitted across the network 101. The header 3325 includes a destination address (if TCP/IP protocol is employed, the header 3325 includes the IP address of a destination device 3702 (device B)). When the address of the device 3702 matches the address that is included in a header 3331 of the packet 3330, the data segment 3332 is separated from the header 3331 and is fetched by the device 3702.

In this manner, the device B acquires the data segments from the set 3322 and reassembles them to form a set 3335 that it uses to recover the data 3336.

<MFP 104>

Figure 2:
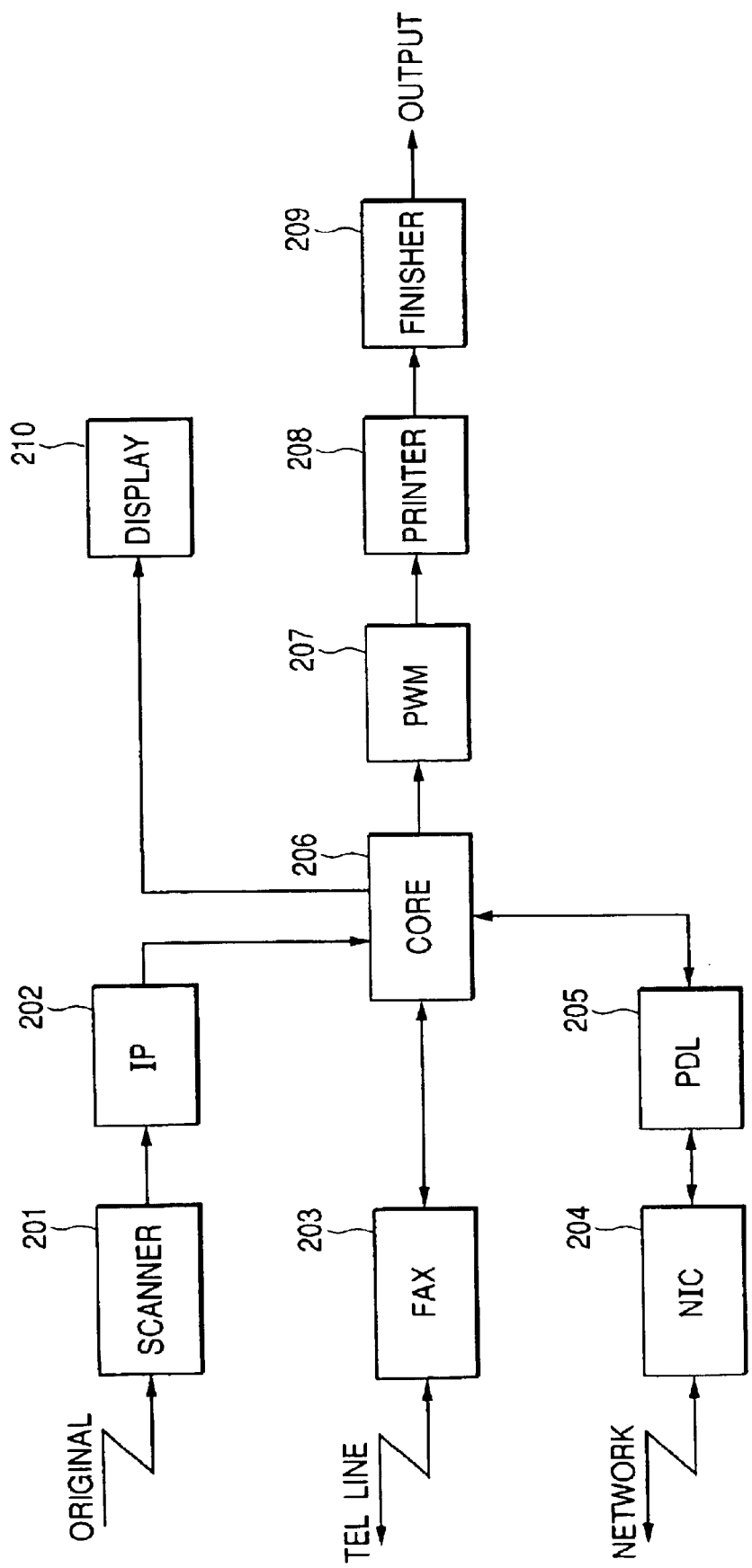
FIG. 2 is a block diagram illustrating an image forming apparatus.

The arrangement of the MFP 104 will now be explained. FIG. 2 is a block diagram illustrating the arrangement employed for the MFP 104. As is shown in FIG. 2, specific components of the MFP 104 are: a scanner 201, for reading an image; an IP (image processor) 202, used for processing obtained image data; a FAX (facsimile machine) 203, for exchanging image data across a telephone line; an NIC (Network Interface Card) 204, for facilitating the exchange of image data and apparatus data across a network; a PDL (page description language) assembly 205, for developing data, written in a page description language, that are received from a computer via the NIC 204; a core 206, for temporarily storing image data in accordance with the employment of the MFP 104 and for determining transmission routes; a PWM (pulse width modulator) 207, for performing the pulse width modulation of image data output by the core 206; a printer 208, for printing image data; a finisher 209, for performing an output finish process for paper; and a display unit 210, for providing a preview function that eliminates the need to print an image or for determining the print state status.

<Scanner 201>

Figure 3:
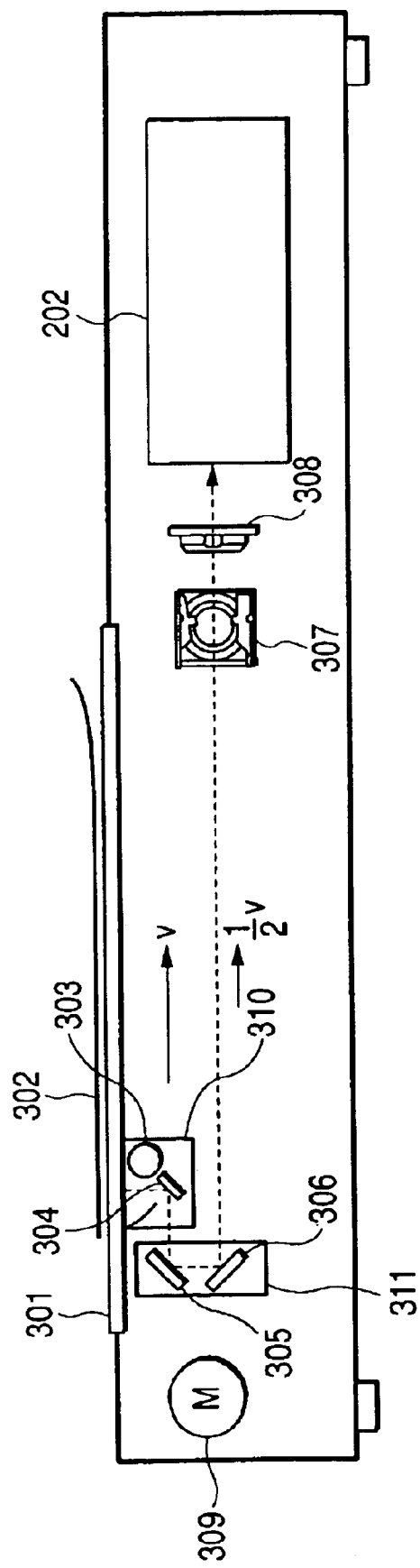
FIG. 3 is a diagram illustrating the arrangement of a scanner in the image forming apparatus.

The arrangement and the operation of the scanner 201 will now be described. FIG. 3 is a diagram showing the arrangement employed for the scanner 201. When a document 302 is to be copied, it is positioned flat, face down, on a document mounting glass 301. Then a luminaire 303 irradiates the document 302, and an optical system 307, using light reflected by mirrors 304, 305 and 306, forms an image on a CCD 308. During this process, to scan the entire surface of the document 302, a first mirror unit 310, which includes the mirror 304 and the luminaire 303, is mechanically driven by a motor 309 at a speed v in a direction indicated by an associated arrow, and a second mirror unit 311, which includes the mirrors 305 and 306, is mechanically driven at a speed ½v in a direction indicated by an associated arrow.

<Image Processor (IP) 202>

Figure 4:
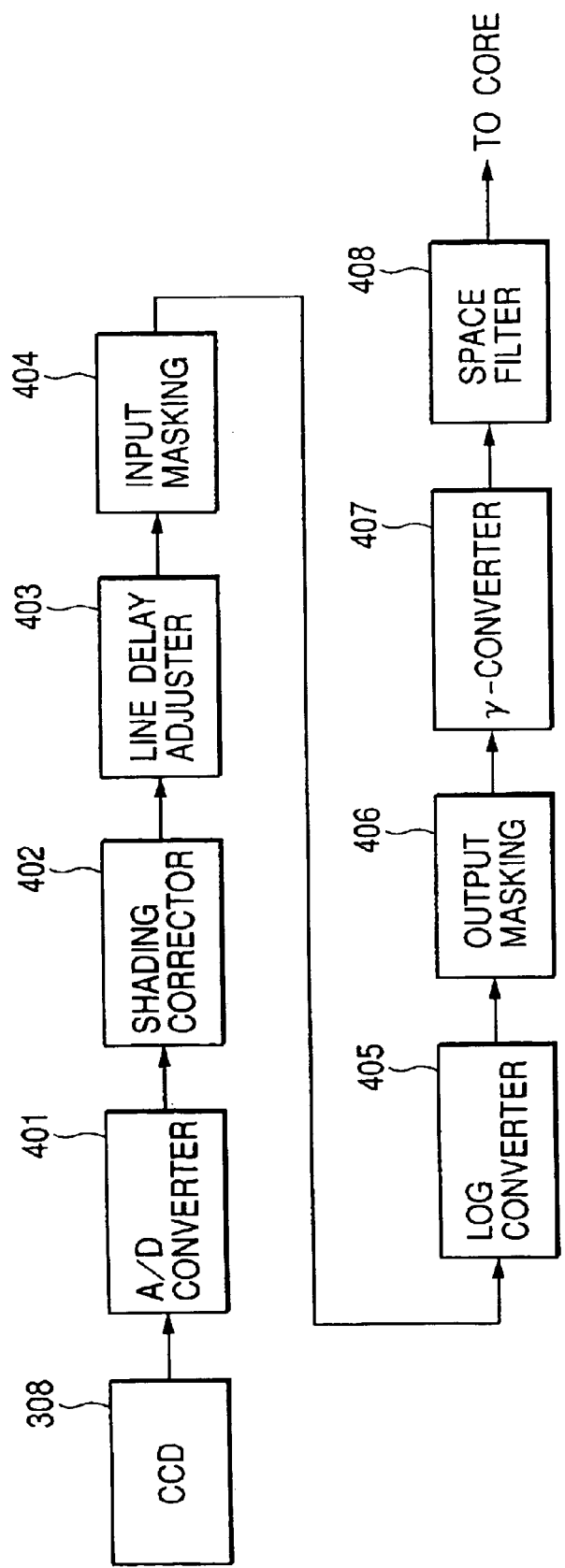
FIG. 4 is a block diagram illustrating an image processor in the image forming apparatus.

The image processing unit 202 will now be described. FIG. 4 is a block diagram illustrating the arrangement employed for the image processing unit 202. An input optical signal is converted into an electrical signal by a CCD sensor 308, which is an RGB line color sensor, and electrical signals for the RGB colors are transmitted to an A/D converter 401. After the A/D converter 401 adjusts the gain and the offset of the electrical signals, it generates B-bit digital image signals R0, G0 and B0 for the individual color signals. Then, for each color a shading corrector 402 performs a well-known shading correction of a read signal for a reference white board. Further, Since the individual color line sensors in the CCD sensor 308 are situated at predetermined intervals, a spatial shift in the sub-scanning direction can be corrected by a line delay adjustment circuit 403.

An input masking unit 404 converts into NTSC standard color space a read color space that is determined in accordance with the spectral characteristics of the R, G and B filters of the CCD line sensor 308. A 3×3 matrix calculation is performed using a constant inherent to the apparatus, while taking various characteristics, including the sensitivity and the spectral characteristics of the CCD sensor 308, into account. Thereafter, an input luminance signal (R0, G0, B0) is converted into a reference luminance signal (R, G, B).

Following this, a luminance/density converter (LOG converter) 405, which is constituted by a look-up table (LUT), converts RGB luminance signals into density signals C1, M1, Y1 and K1.

An output masking/UCR circuit 406 is a section for performing a matrix calculation to convert C1, M1, Y1 and K1/and Y1 signals into Y, M, C and K signals that represent the toner colors employed by the image forming apparatus. To do this, the output masking/UCR circuit 406 corrects the C1, M1, Y1 and K1 signals, which, based on the RGB signals, were obtained by the CCD sensor 308, to provide C, M, Y and K signals that are based on the spectral characteristics of the toners. Thereafter, a γ-converter 407 employs the look-up table (LUT), which is prepared while taking various color characteristics of the toners into account, and converts the C, M, Y and K signals into C, M, Y and K data for the image output. And finally, a spatial filter 408 performs the sharpness or smoothing processing for the C, M, Y and K data, and transmits the resultant image signals to the core 206.

<FAX Unit 203>

Figure 5:
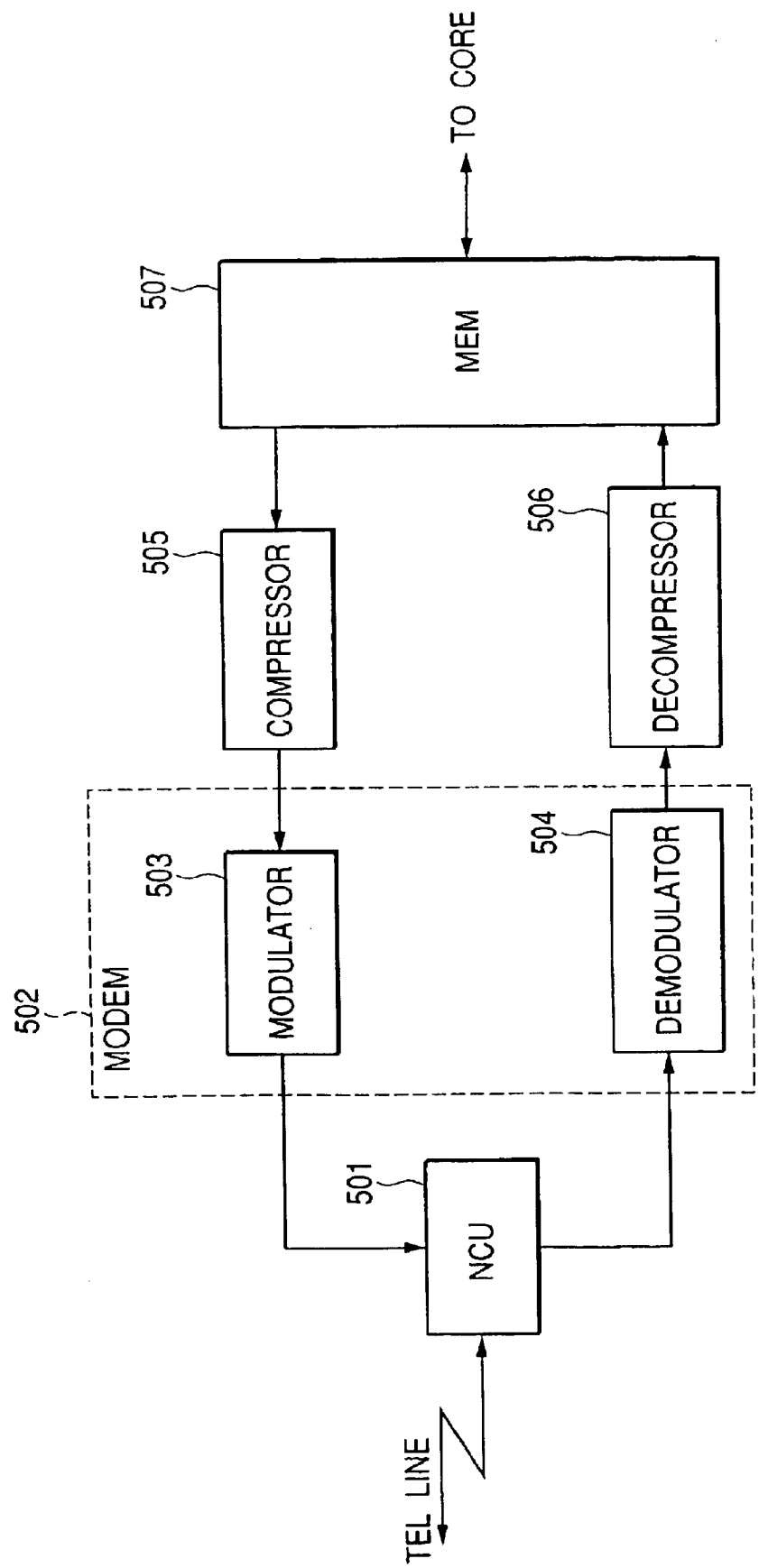
FIG. 5 is a block diagram illustrating the arrangement of a FAX in the image forming apparatus.

The FAX (facsimile machine) 203 will now be explained. FIG. 5 is a block diagram illustrating the arrangement employed for the FAX 203. First, in the data reception process, an NCU control unit 501 receives data transmitted along the telephone line, and changes its voltage. Then a demodulator 504 in a modem 502 performs an A/D conversion and the demodulation of received data, following which a decompressor 506 rasterizes the received data; a process for which no further explanation will be given because the method that is generally employed for facsimile machine compression/decompression, the run-length method, is well known. Subsequently, the raster data are temporarily stored in a memory 507 until it has been confirmed that there are no transmission errors, and then the data are transmitted to the core 206.

In the transmission process, a compressor 505 employs the run-length method, for example, to compress the raster data that are transmitted by the core 206. The modulator 503 in the modem 502 performs the D/A conversion and modulation of the data, following which the resultant data are transmitted to the telephone line via the NCU 501.

<NIC Unit 204>

Figure 6:
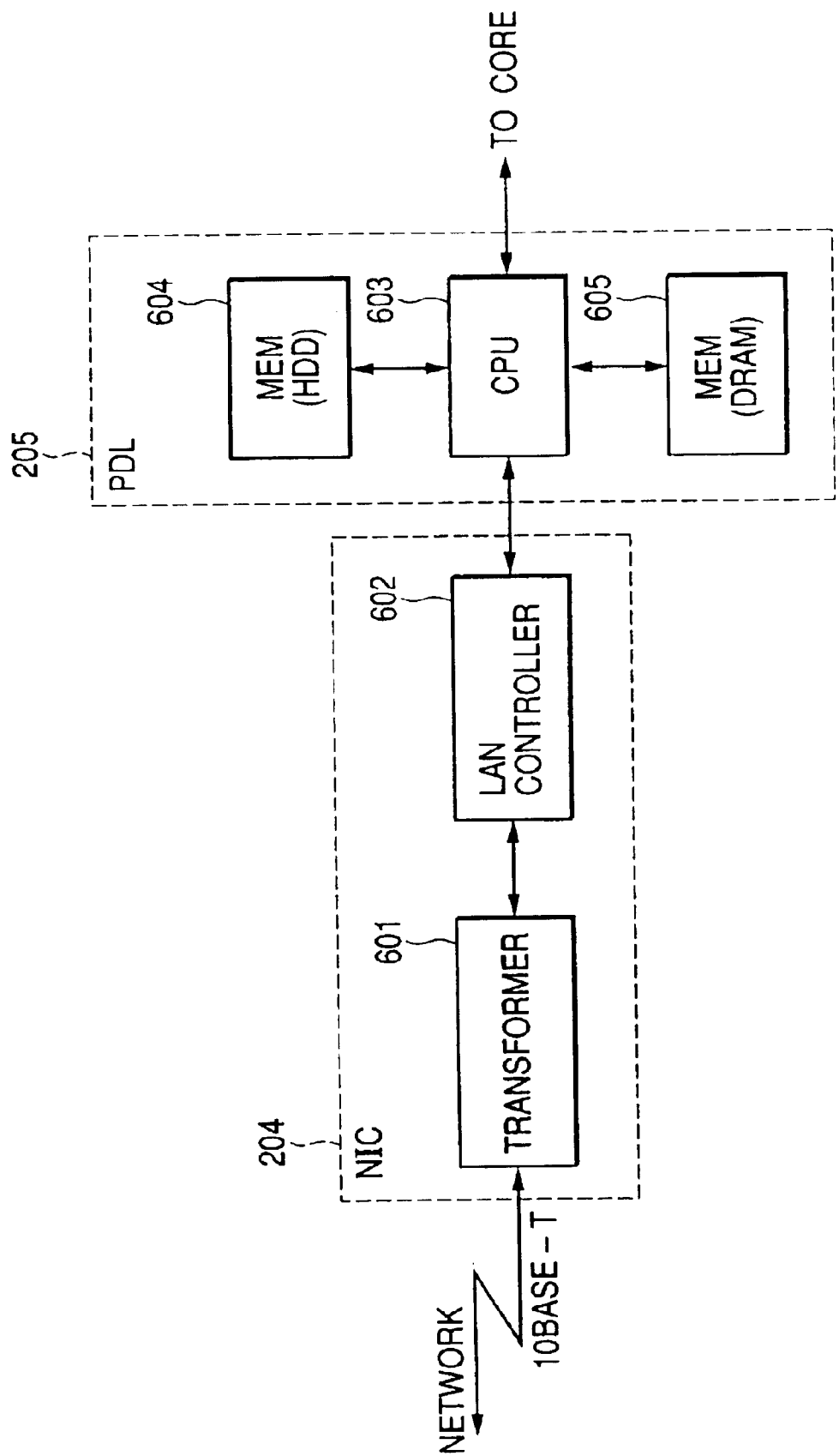
FIG. 6 is a block diagram illustrating the arrangements of an NIC and a PDL assembly in the image forming apparatus.

The NIC unit 204 will now be described. FIG. 6 is a block diagram illustrating the NIC unit 204 and the PDL unit 205. The NIC unit 204 provides an interface function for the network 101 in FIG. 1. For example, the NIC unit 204 exchanges data with an external device by employing an Ethernet standard, such as 10Base-T.

To obtain data from an external device across the network, first, a transformer 601 changes a voltage that it transmits to a LAN controller 602. The LAN controller 602, which includes a buffer memory 1 (not shown), determines whether the received data are required. If the data are required, the LAN controller 602 transmits the data to a buffer memory 2 (not shown), and outputs a signal to the PDL assembly 205.

To provide data for an external device, the LAN controller 602 adds required information to data received from the PDL assembly 205, and the resultant data are transmitted to the network via the transformer 601.

<PDL Assembly 205>

The PDL assembly 205 will now be described while referring to FIG. 6. An image created by application software running on the computer consists of a document, graphics or a photo. The data representing the image consist of a combination of image description elements, such as character code, graphics code and raster image data. These data are written in a so-called PDL (Page Description Language). The PDL assembly 205 is a unit for translating data written in the PDL (hereinafter referred to as PDL data) into bitmapped image data.

The PDL data transmitted by the NIC 204 are temporarily stored in a large-capacity memory 604, such as a hard disk (HDD), and are managed or saved for each job. Then, as needed, a CPU 603 executes so-called raster image processing (RIP) to rasterize the PDL data. The rasterized image data for each job are then stored as page units in a fast accessible memory 605, such as a DRAM, and are transmitted to the core 206 in consonance with the state of the printer 208.

<Core 206>

Figure 7:
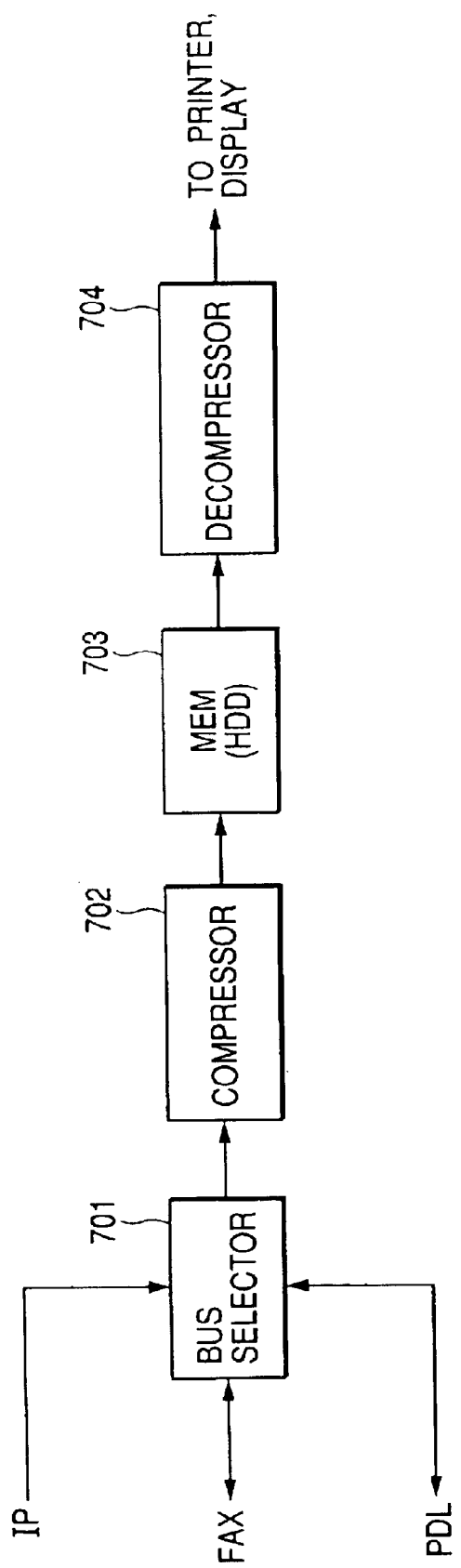
FIG. 7 is a block diagram illustrating the arrangement of a core in the image forming apparatus.

The core 206 will now be described. FIG. 7 is a block diagram illustrating the arrangement employed for the core 206. In the core 206, a bus selector 701 is in charge, as it were, of traffic control in the MFP 104. That is, the bus selector 701 effects bus changes in accordance with the functions of the MFP 104, which include a copy function that performs a stand-alone operation, network scanning, network printing, facsimile transmission/reception and data display. More specifically, data are transmitted in consonance with a selected function.

- stand-alone copying: the scanner 201 to the core 206 to the printer 208
- network scanning: the scanner 201 to the core 206 to the NIC 204
- network printing: the unit 204 to the core 206 to the printer 208
- facsimile transmission: the scanner 201 to the core 206 to the FAX 203
- facsimile reception: the FAX 203 to the core 206 to the printer 208
- data display: the scanner 201 to the core 206 to the display unit 210
- (the input source for the display function may be either the FAX 203 or the NIC 204).

The image data output by the bus selector 701 are transmitted via the large-capacity memory 703, such as a hard disk, and the decompressor 704 to the printer 208 or to the display unit 210. For the data compression, a common method, such as JPEG, JBIG or ZIP, can be used.

The image data compressed by the compressor 702 are individually managed for each job, and are stored in the memory 703 with additional data, such as a file name, a creator name, a creation date and a file size. Further, when a job number and a password are defined and are stored together in the memory 703, a function, a personal box function, can also be supported that provides for the temporary storage of data and for the printing of data (by reading the data from the HDD) prepared by a specific user. To select and retrieve one of the stored jobs for printing, a user must enter a password, and only after the password has been verified are the data read from the HDD and decompressed to obtain rasterized image data for transmission to the printer 208.

\<PWM 207\>

Figure 8:
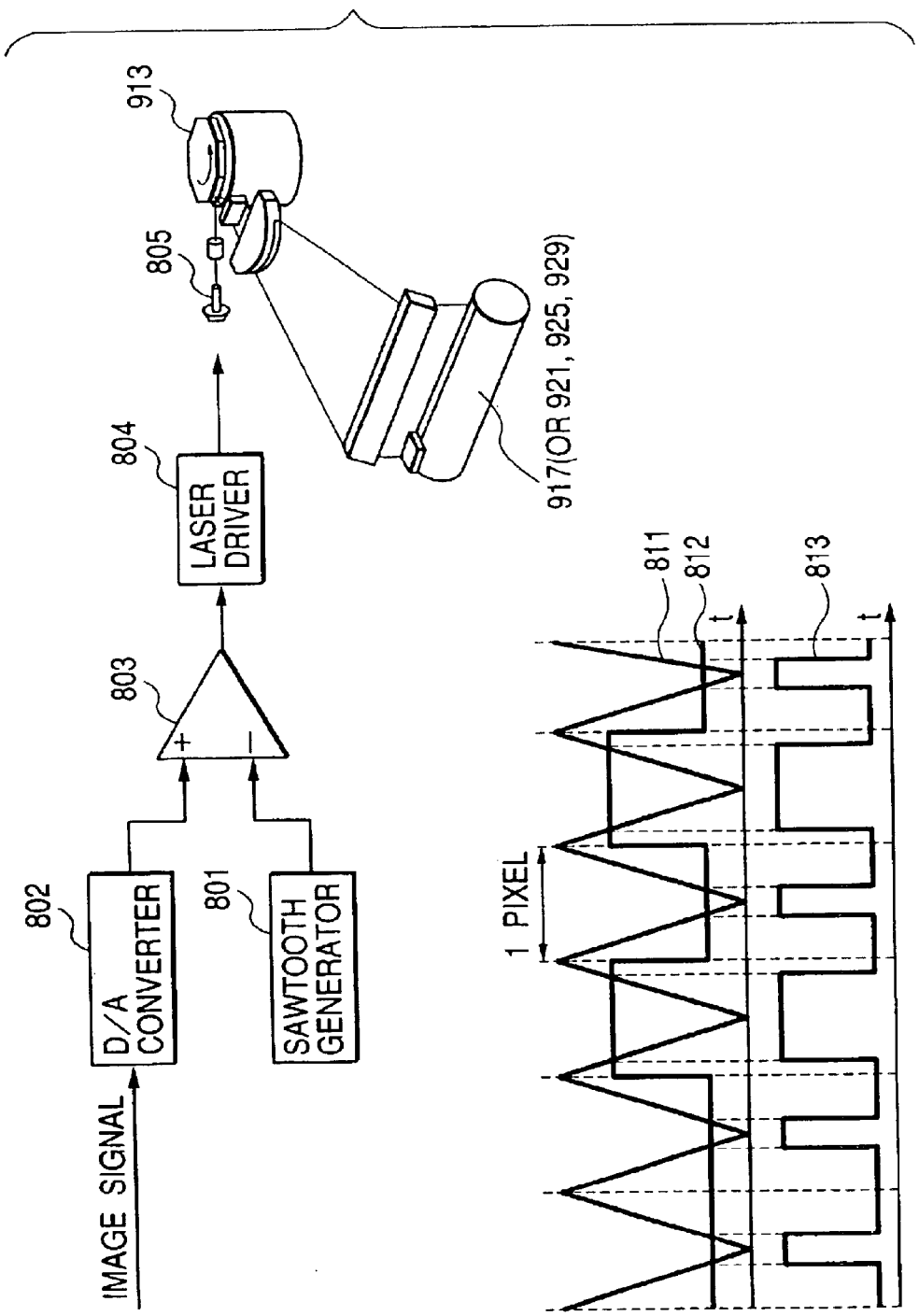
FIG. 8 is a diagram illustrating the arrangement of a PWM in an image forming apparatus, and of pulse width modulation.

The PWM 207 will now be explained. FIG. 8 is a diagram showing the arrangement employed for the PWM 207, and pulse width modulation (PWM). First, image data are separated into those for the four colors yellow (Y), magenta (M), cyan (C) and black (K), and are output by the core 206 through respective PWMs 207 to form images.

In FIG. 8, a sawtooth generator 801 generates a triangular wave. A D/A converter 802 converts a received digital image signal into an analog signal. A comparator 803 compares a triangular wave 811 with an image signal 812, and outputs a PWM signal 813. And a laser driver 804 controls the ON/OFF states of CMYK lasers, in accordance with the PWM signal 813 received from the comparator 803, and drives CMYK semiconductor lasers 805 that emit CMYK laser beams, which are projected through a polygon mirror 913 and which will be described later, that are used to scan corresponding photosensitive drums 917, 921, 925 and 929.

\<Printer 208\>

Figure 9:
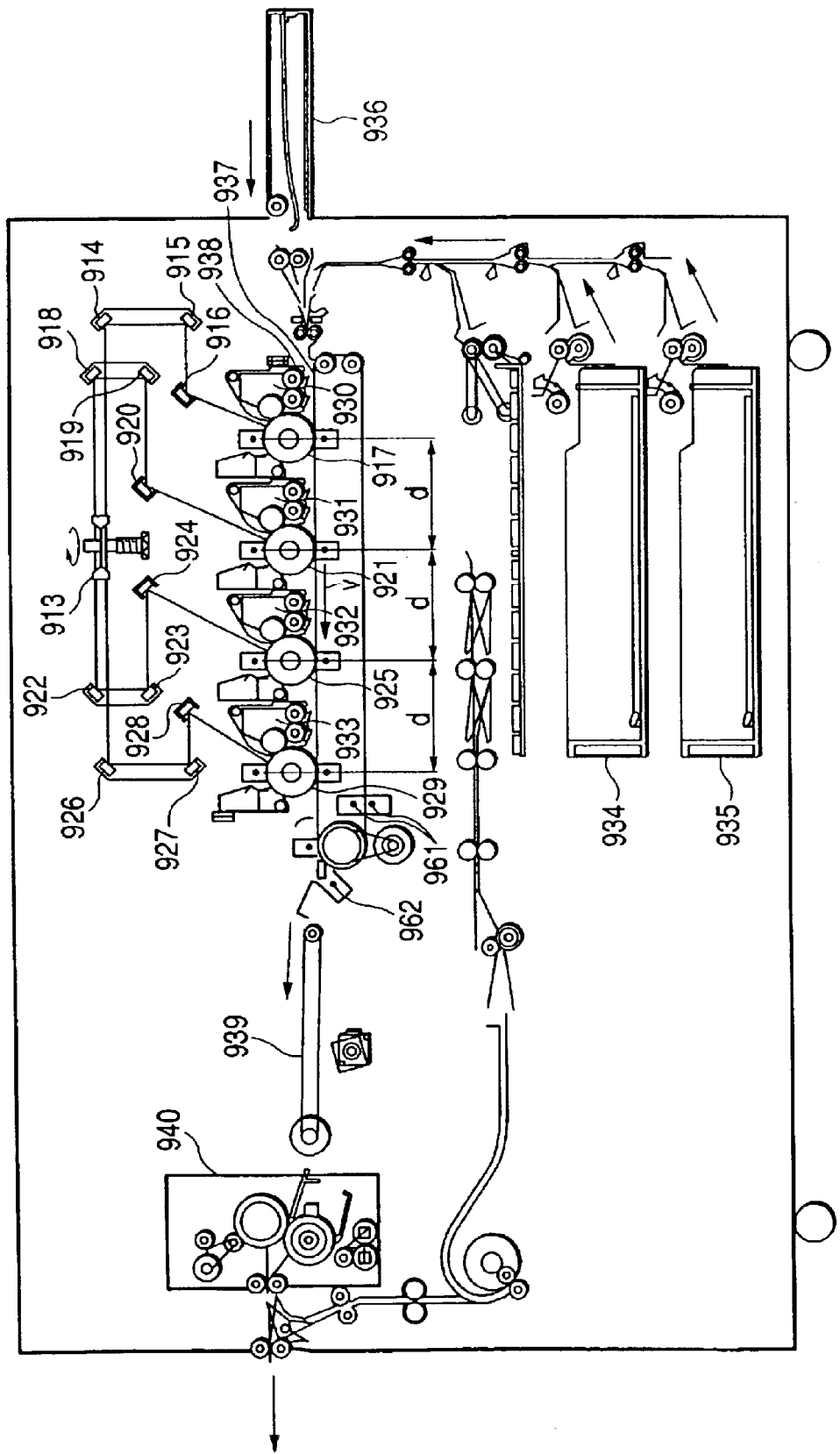
FIG. 9 is a side cross-sectional view of the arrangement of a printer in the image forming apparatus.

The printer 208 will now be described. FIG. 9 is a side cross-sectional view of the structure of the printer 208. In FIG. 9, the polygon mirror 913 receives four laser beams (CMYK) from four semiconductor lasers 805. A yellow (Y) laser beam is passed through mirrors 914, 915 and 916 and scans the photosensitive drum 917; a magenta (M) laser beam is passed through mirrors 918, 919 and 920 and scans the photosensitive drum 921; a cyan (C) laser beam is passed through mirrors 922, 923 and 924 and scans the photosensitive drum 925; and a black (K) laser beam is passed through mirrors 926, 927 and 928 and scans the photosensitive drum 929.

A developing unit 930, which supplies yellow (Y) toner, forms a yellow toner image on the photosensitive drum 917 that corresponds to a latent image drawn with yellow (Y) laser beam. A developing unit 931, which supplies magenta (M) toner, forms a magenta toner image on the photosensitive drum 921 that corresponds to a latent image drawn with the magenta (M) laser beam. A developing unit 932, which supplies cyan (C) toner, forms a cyan toner image on the photosensitive drum 925 that corresponds to a latent image drawn with the cyan (C) laser beam. And a developing unit 933, which supplies black (K) toner, forms a black toner image on the photosensitive drum 929 that corresponds to a latent image drawn with the black (B) laser beam. As a result, since toner images in four colors (Y, M, C and K) are formed on a sheet, a full-color image is output.

A sheet is fed from either sheet cassette 934 and 935, or via a manual insertion tray 936, through resist rollers 937, and is attracted to and conveyed by a transfer belt 938. In synchronization with the paper feeding process, the color toner images are developed in advance on the photosensitive drums 917, 921, 925 and 929 and are individually transferred to the sheet as it is carried by the drums.

The sheet bearing the color toner images is separated from the last drum and is conveyed by a feeding belt 939 to a fixing unit 940, where the toner is fixed to the sheet.

The four photosensitive drums 917, 921, 925 and 929 are positioned at equal distances d, and the sheet is fed by them, by the feeding belt 939, at a constant speed v in synchronization with the driving of the four semiconductor lasers 805.

\<Finisher 209\>

Figure 10:
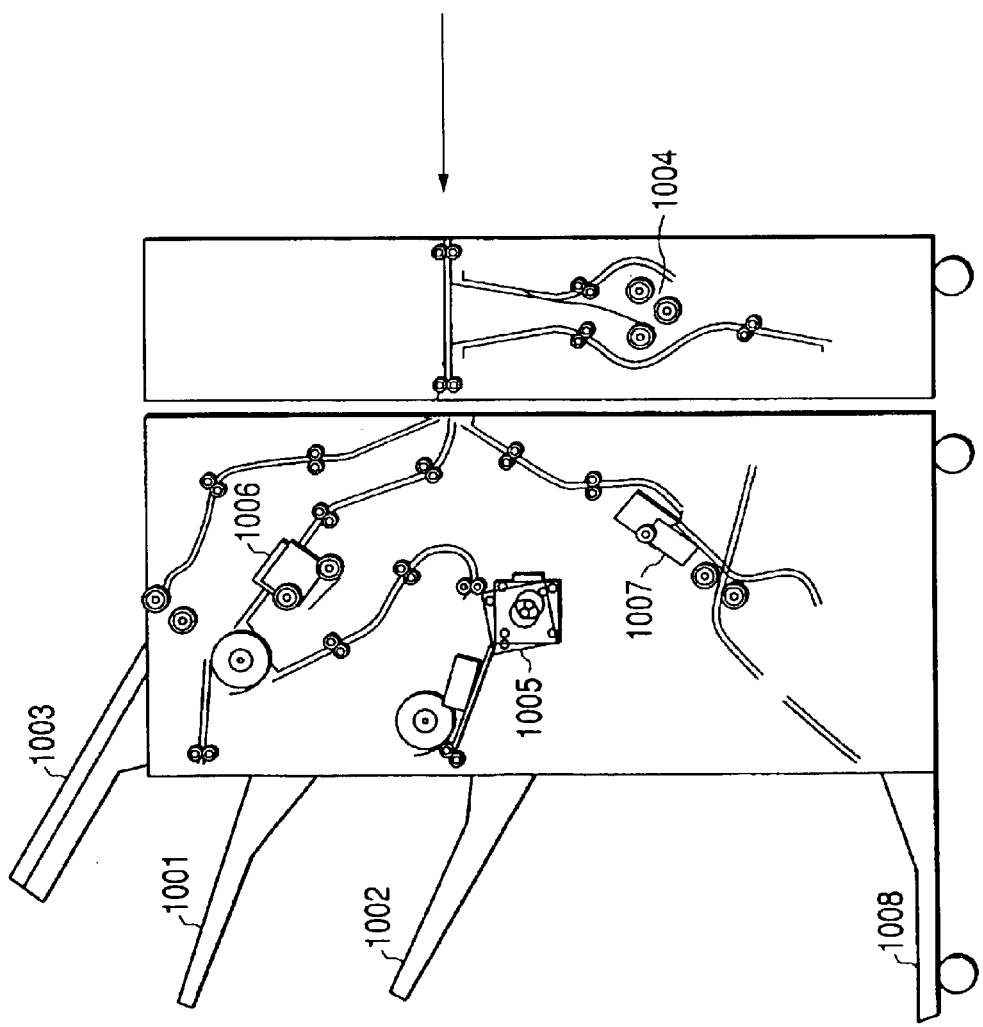
FIG. 10 is a side-view of the arrangement of a finisher in the image forming apparatus.

The finisher 209 will now be explained. FIG. 10 is a cross-sectional side view of the structure of the finisher 209, to which a sheet is output by the fixing unit 940 of the printer 208. As is shown in FIG. 10, a sample tray 1001 and a stack tray 1002 are provided for the finisher 209, and are selected in accordance with the job type and the number of sheets to be discharged. Thereafter, the sheets are discharged to the selected tray.

Two paper sorting methods are used: a bin sorting method, according to which sheets are sorted to a plurality of bins; and a shift sorting method, according to which sheets are sorted for individual jobs by employing an electronic sorting function that shifts bins (or trays) forward and backward.

The electronic sorting function used here is called collation, and for it the large-capacity memory described for the core unit 206 is employed. A buffer memory is used to change the page order and the discharge order, which are stored in the buffer memory.

In addition to the above function by which the sorting of sheets for individual jobs is performed, a grouping function is included for identifying page types. In addition, sheets for a job can be stored internally, and can be fastened together by a stapler 1005 immediately before being discharged to the stack tray 1002.

Furthermore, located along the discharge path leading to the two trays is a Z-shaped folding machine 1004, for folding a sheet into a Z shape, as well as a puncher 1006, for punching two (or three) holes in a sheet for filing; processes that are performed in accordance with the job type. Also provided for an insertion function is an inserter 1003 into which sheets that are to be so processed are inserted. And in addition, a saddle stitcher 1007 is provided that folds sheets into a booklet form and binds them together in the middle, before discharging them to a booklet tray 1008.

\<Display Unit 210\>

Figure 11:
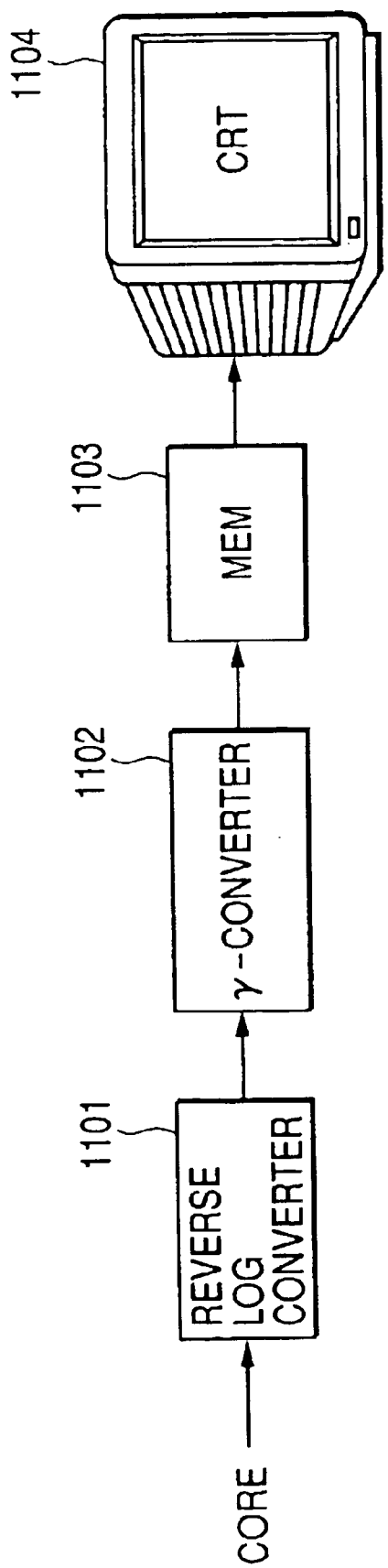
FIG. 11 is a diagram illustrating the arrangement of a display unit in the image forming apparatus.

The display unit 210 will now be described. FIG. 11 is a diagram showing the structure of the display unit 210. Since image data output by the core unit 206 are CMYK data, a reverse LOG converter 1101 converts the image data to RGB data. Then, to match the color characteristics of a display device 1104, such as a CRT, a γ-converter 1102 employs a look-up table to convert the output data. The obtained image data are temporarily stored in a memory 1103, and are displayed by the display device 1104.

The display unit 210 provides for a user a preview function for the advance confirmation of an output image, and a proof function for determining whether an image to be output corresponds to the one desired. Thus, when a user confirms, using the display unit 210, that an image need not be printed, no printing sheets are wasted.

\<Arrangement for a Server and a Client\>

Figure 38:
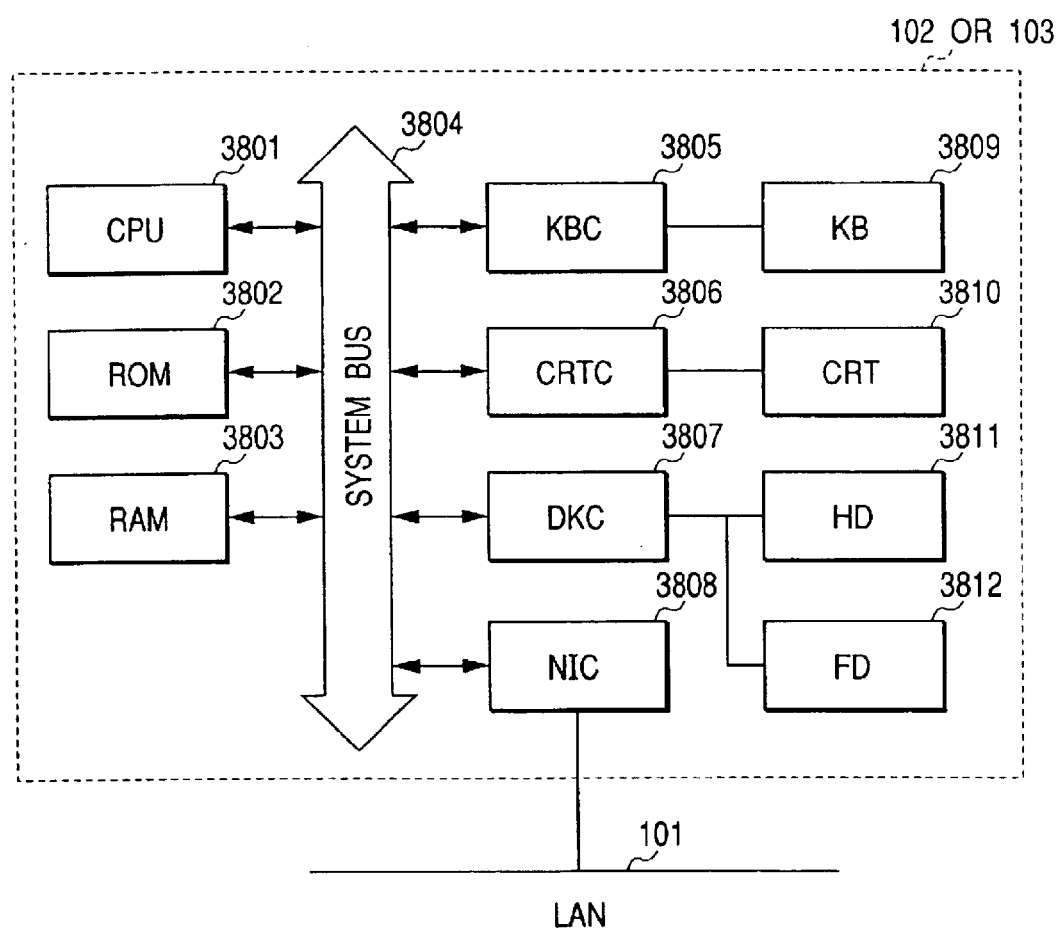
FIG. 38 is a diagram showing the control arrangement of a host computer.

The control configuration for the server 102 and the client 103 will now be described. FIG. 38 is a diagram showing a host computer for which is employed network utility software that will be described later, and by which the server 102 and the client 103 in FIG. 1 are implemented.

A CPU 3801 executes a utility software program that is stored in a ROM 3802, or on a recording medium, such as a hard disk (HD) 381 or a floppy disk (FD) 3812, and in general, controls the individual devices connected to a system bus 3804.

A RAM 3803 functions as a main memory or a work area for the CPU 3801. A keyboard controller (KBC) 3805 controls the entry of instructions by a user who employs a keyboard (KB) 3809 or a pointing device (not shown). A CRT controller (CRTC) 3806 controls the screen display for a CRT display (CRT) 3810. A disk controller (DKC) 3807 controls the accessing of the hard disk (HD) 3811 or the floppy disk (FD) 3812, on which are stored a boot program, various applications, an editing file, a user file and a network device management program. A network interface card (NIC) 3808 is used to exchange data with the MFP 104 via the LAN 101.

In all the previous explanations, so long as it is not otherwise specified, the primary hardware for program execution is defined as the CPU 3801, and the primary software is defined as the network utility software stored on the hard disk (HD) 311.

<Network Utility Software>

Referring again to FIG. 1, the utility software running on the client 103 will be described. A standardized database called an MIB (Management Information Base) is constructed in the network interface unit (the assembly comprising the NIC 204 and the PDL unit 205) in the MFP 104. The network interface unit communicates with a computer across the network using a network management protocol called SNMP (Simple Network Management Protocol). The SNMP and the MIB are employed for the management of the MFP 104, and a printer and a facsimile machine that are connected to another network.

The computer 102 or 103 executes a software program, called utility software, that employs the SNMP to communicate with the MFP 104 via the network, and that employs the MIB to exchange necessary information.

For example, when the utility software uses the MIB to read information, whether or not the finisher 209 is connected can be determined from the equipment data supplied for the MFP 104, whether or not printing is currently enabled can be determined from the status data, and the name of the MFP 104 or its installation site can be determined from other information that is acquired. In addition, when the utility software reads the MIB to write data, the name and the installation site of the MFP 104 can be changed. Furthermore, since if all the clients are permitted to write data, it is difficult to manage the devices (to manage the database in which device data is stored), the reading/writing of data that is permitted can be limited for the user, or for the server 102 and the client 103 when it is so identified.

Figure 31:
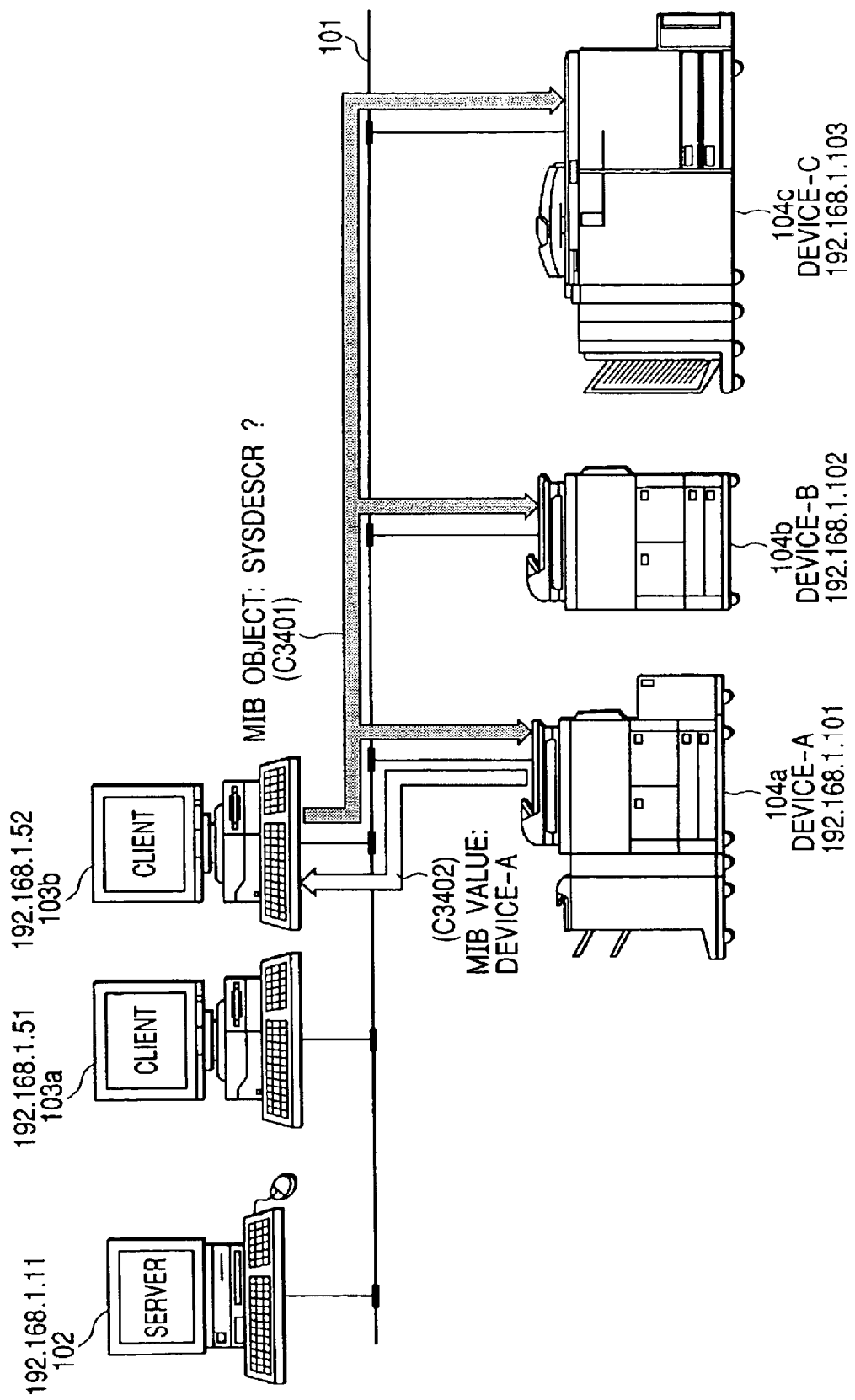
FIG. 31 is a diagram showing the exchange of data between clients and image forming apparatuses.

Specifically, a server 102, a client 103a, a client 103b, an MFP 104a, an MFP 104b and an MFP 104c are connected to the network in FIG. 31. Their IP addresses are: 192.168.1.11; 192.168.1.51; 192.168.1.52; 192.168.1.101; 192.168.1.102; and 192.168.1.103. And for all of them, the sub-net mask is set to 255.255.255.0.

The client 103b designates the IP address as 192.168.1.255 and transmits a message (an MIB object). This message, which is an inquiry for the value of an MIB object "sysDescr" that represents the name of a device, is broadcast and is received by the MFP 104a, the MFP 104b and the MFP 104c. Immediately upon receiving this message, the MFP 104a sends a reply to the effect that the registered name is "Device-A" (the MIB value of the sysDescr is "Device-A"). The same reply is sent by the MFP 104b and the MFP 104c.

That is, by employing the above described functions, the utility software can obtain various data, such as data covering the equipment available at the MFP 104, the operating state of the apparatus, the network setup, the state of a job, and the employment status.

<GUI>

Figure 12:
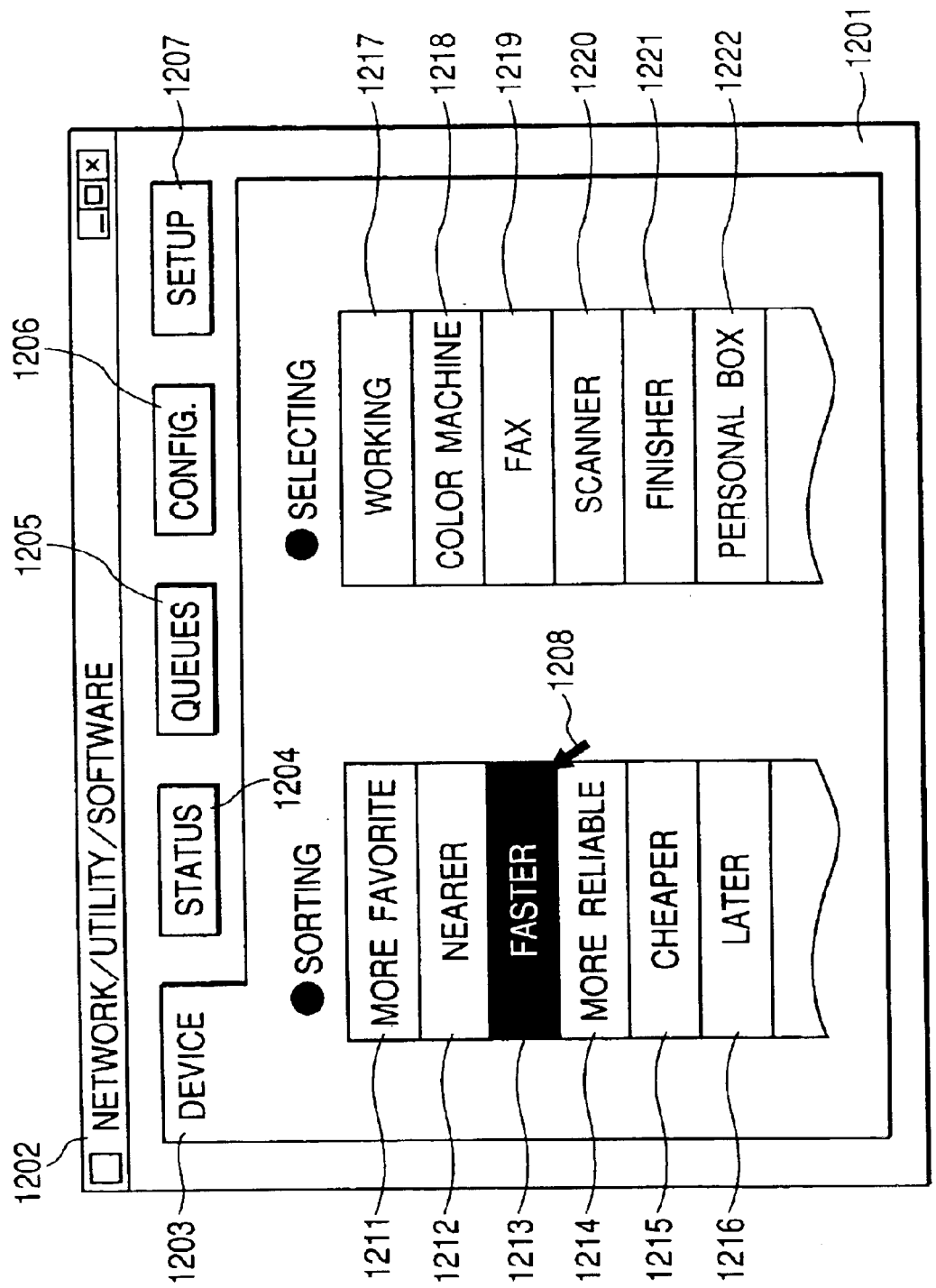
FIG. 12 is a diagram showing a device tab screen for utility software.

An explanation will now be given for a utility software screen called a GUI (Graphic User Interface) that is operated by the computer 102 or 103. In FIG. 12 is a diagram of a utility software screen.

First, when execution of the utility software is initiated by the computer 102 or 103, the screen shown in FIG. 12 is displayed. Appearing on the screen are a window 1201 and a cursor 1208. When a user employs a mouse to move the cursor 1208 to a predetermined location in the window 1201 and clicks a mouse button, another window is opened or the window 1201 is shifted to the next state.

A title bar 1202 is used to display the rank or the title of the current window, and tabs 1203 to 1207 are provided for individual function types that a user can select to read or to access desired data. In the example in FIG. 12, the device tab 1203 is used to present a list of the devices that are available, and the status tab 1204 is used to provide data concerning the status of each apparatus. The queue tab 1205 is used to provide an evaluation of the state of jobs that are queued and of traffic among the devices, the configuration tab 1207 is used to present data concerning the equipment provided for the apparatuses, and the setup tab 1207 is used to provide the network setup data for the apparatuses.

<Device Tab>

The device tab of the above utility software will also be described while referring to FIG. 12. First, when the device tab 1203 is clicked on, the entries for the sorting function and the selecting function appear. The sorting function is a function whereby, for display on the list, the MFPs 104 that are connected to the network are sorted in accordance with the various following parameters, 1211 to 1216, that were prepared for the sorting function. The "More Favorite" parameter 1211 is used to arrange the MFPs 104 in a described device order. The "Nearer" parameter 1212 is used to arrange the MFPs 104 in order beginning with the device that is located nearest the client. The "Faster" parameter 1213 is used to arrange the MFPs 104 in the descending or ascending order of the printing speeds of the devices. The "More Reliable" parameter 1214 is used to arrange the MFPs 104 in descending order in consonance with their demonstrated operating reliability (e.g., in the order, beginning with the smallest, corresponding to the frequency at which paper jamming and errors have occurred). The "Cheaper" parameter 1215 is used to arrange the MFPs 104 in order beginning with the one having the lowest per sheet printing cost. The "Later" parameter 1216 is used to arrange the MFPs 104 in order beginning with the device that was purchased last. Although not shown in FIG. 12, the MFPs 104 can be rearranged in accordance with the statuses of the MFPs 104 or the degree of employment, such as the wear and tear suffered by the consumable parts of the MFPs 104, the volume of toner remaining, and the number of sheets on hand.

The selecting function is a function whereby, for display on the list, devices are chosen in accordance with specific conditions that correspond to various parameters, 1217 to 1222, that were are prepared for the conditions. The "Working" parameter 1217 is used to display only those devices on the network that are ready to perform printing (a device in the OFF state and a device whereat a paper jam has occurred are not displayed). The "Color Machine" parameter 1218 is used to display only those devices that can output (or input) color images. The "FAX" parameter 1219 is used to display only those devices that include the facsimile function. The "Scanner" parameter 1220 is used to display only those devices that include the scanning function. The "Finisher" parameter 1221 is used to display only those devices that include the finisher function. And the "Personal Box" parameter 1222 is used to display only the devices that include the above described personal box function.

Although not mentioned here, only devices that satisfy a specific selection condition, in consonance with the capacity or the function of the MFP 104, can be displayed. For example, only devices having a specific printing speed, or only devices capable of handling sheets larger than A3/11× 17 cm can be displayed.

The same sorting function and the selection function can be provided for the status tab, the queue tab, the configuration tab, and the setup tab.

<Device Ranking>

When the "Faster" parameter 1213 in FIG. 12 is designated, the MFPs 104 connected to the network are rearranged in the descending order of their printing speeds, and the window screen is shifted to the display in FIG. 13.

FIG. 13 is a diagram showing a speed ranking screen. On this screen, all or a part of the MFPs 104 connected to the network are rearranged and displayed in the descending (or the ascending) order corresponding to the parameter ("Faster" 1213 in this example) selected in FIG. 12. Specifically, to display the speed ranking, the utility software employs the SNMP/MIB to exchange the necessary information with all or a part of the MFPs 104 on the network, and sorts the MFPs 104 in the network to display them.

In FIG. 13, a title bar 1302 represents the rank of a window 1301. The speed ranking includes a ranking order 1310, a device name 1311 and parameters 1312 to 1317 that are displayed in FIG. 12. These parameters respectively represent a desired device order, the location of the device, the printing speed of the device, the reliability of the device, the printing cost, and the purchase time.

Buttons 1310 to 1309 located at the bottom of the window 1301 are used to shift to another window. The function of the button 1306 is to provide a selection condition for the ranking data when choosing a device. The buttons 1307 and 1308 are used to display preceding and succeeding pages when the ranking display extends over a plurality of pages. And the button 1309 is used to return to the screen in FIG. 12.

Figure 14:
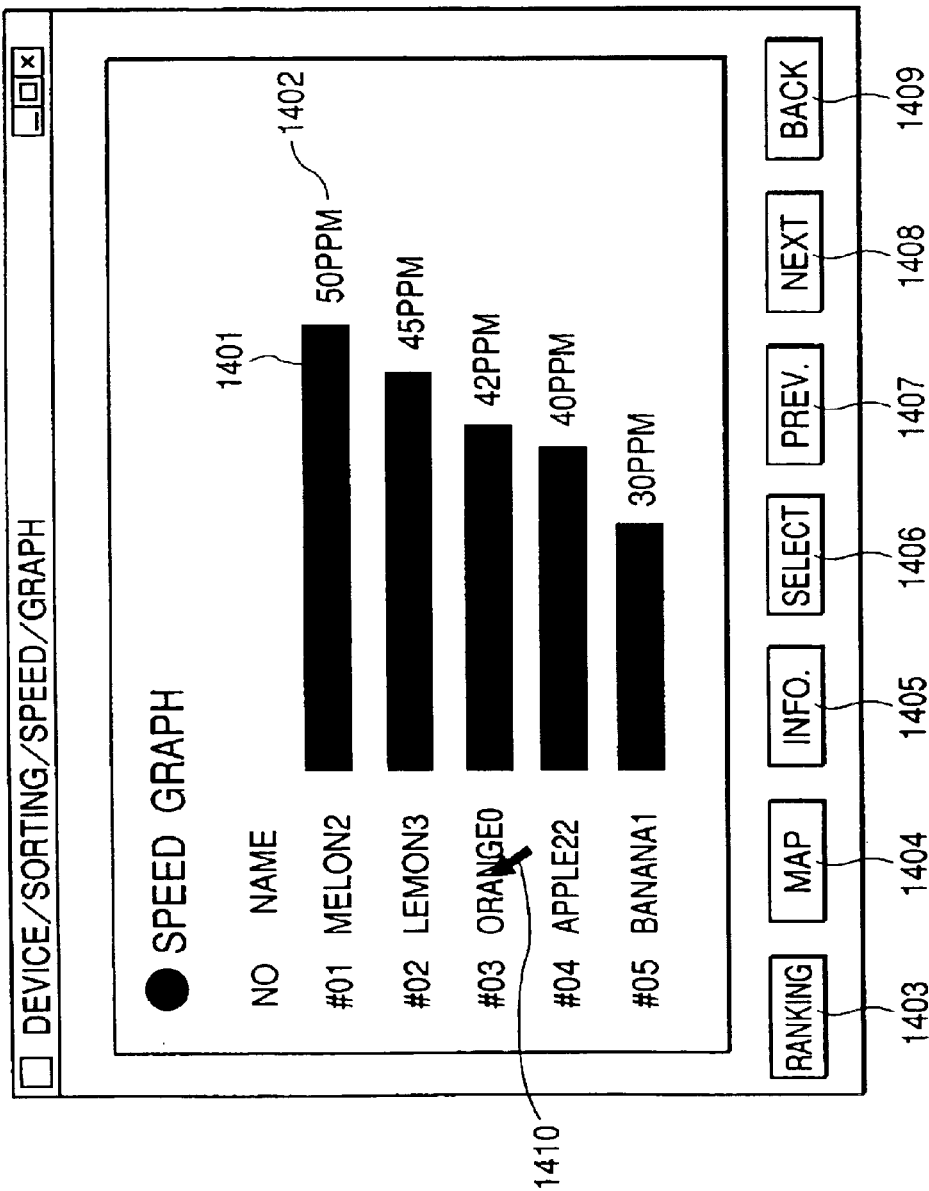
FIG. 14 is a diagram showing a graph screen for the utility software.

When the graph button 1303 is clicked on, the window 1301 is shifted to the screen in FIG. 14. Here, the rankings shown in FIG. 13 are displayed as a graph, so that a user can ascertain what the capacities of the individual devices are.

<Device Selection>

FIG. 17 is a diagram showing a window that is displayed when a color machine listed on the screen in FIG. 12 is selected. In this window, only those devices connected to the network that can output (input) color images are displayed. Various parameters are also provided for the individual devices.

Figure 16:
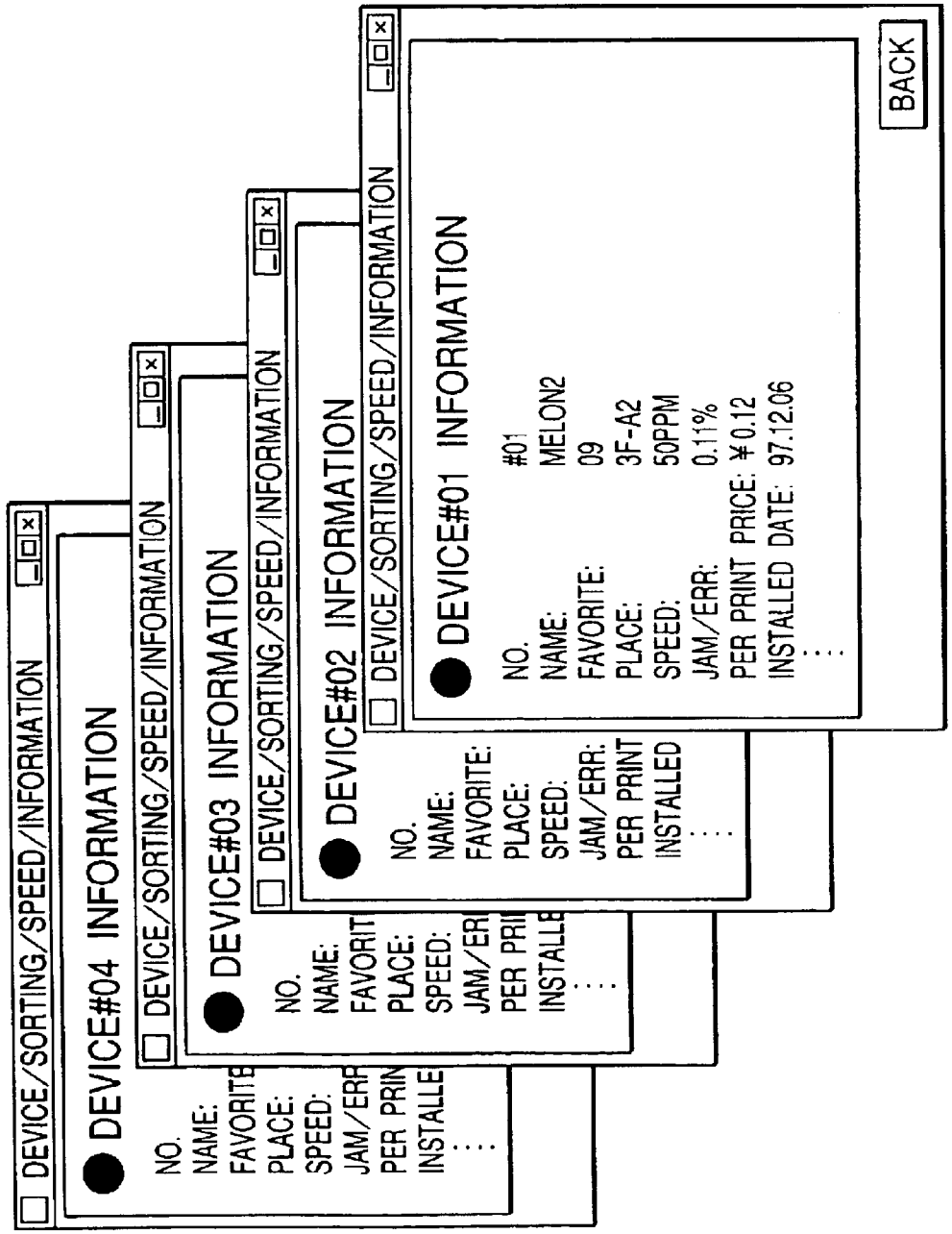
FIG. 16 is a diagram showing multi-window screen 1 for the utility software.
Figure 21:
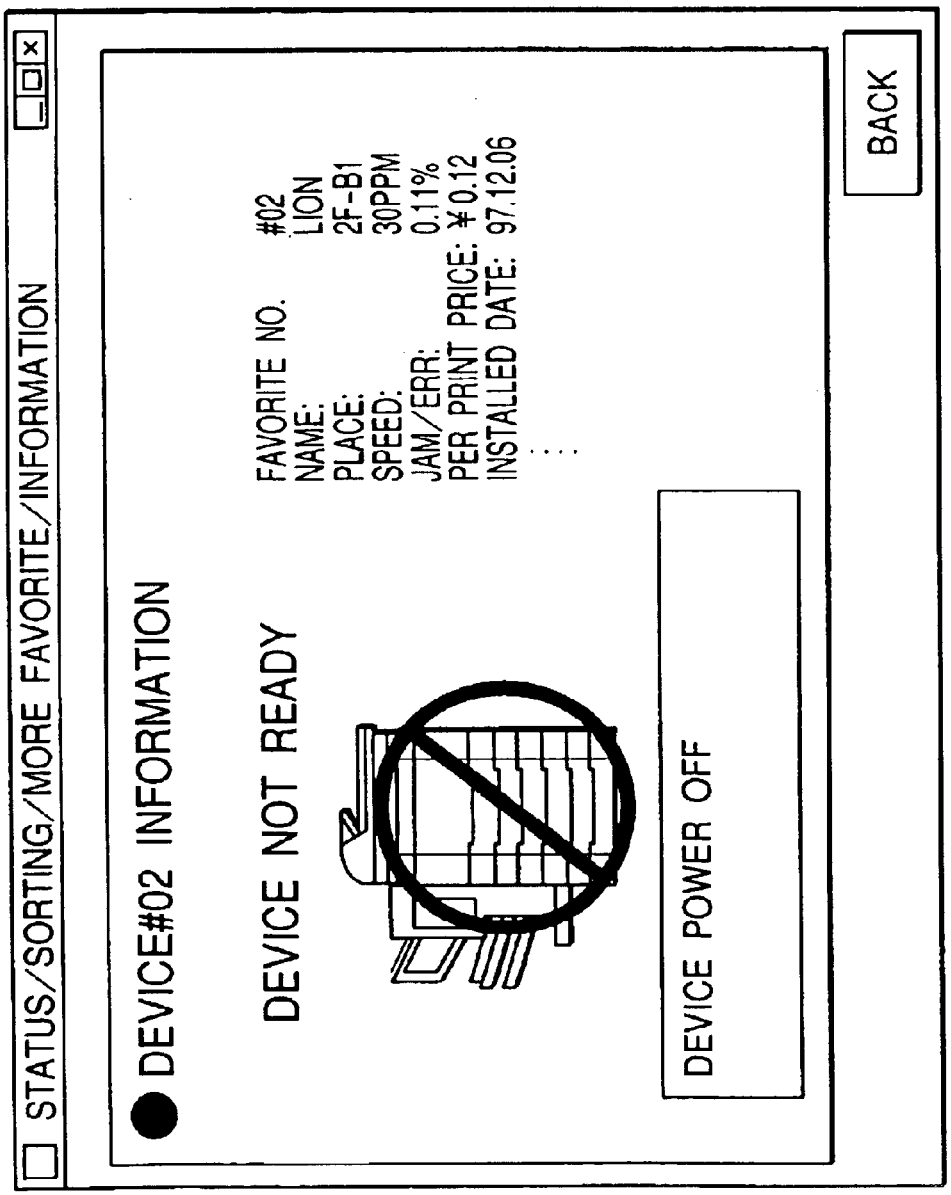
FIG. 21 is a diagram showing a device information screen for the utility software.

When one of the devices is selected by being clicked on, the detailed information shown in FIG. 16 or 21 appears, so that a user can acquire the specifications for the device and can confirm the data.

<Device Map>

Figure 15:
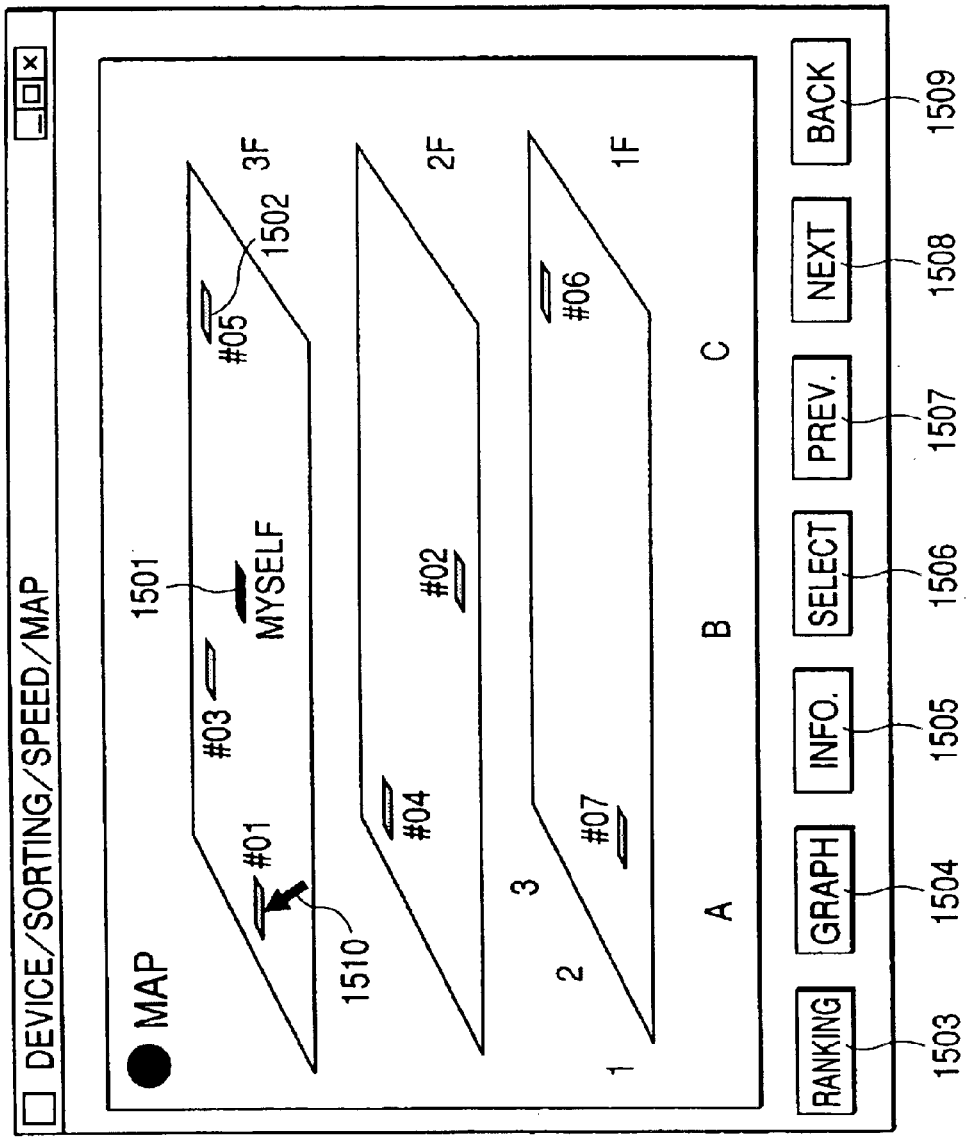
FIG. 15 is a diagram showing map screen 1 for the utility software.

When the button 1304 in FIG. 13 (or the button 1404 in FIG. 14) is clicked Qn, the window is shifted to the map screen in FIG. 15. FIG. 15 is a specific diagram showing the network environment of a three-story building, the individual floors of which are represented by 1F, 2F and 3F. To represent the locations of the MFPs 104 on the floors, A, B, C, 1, 2, and 3 are used. The location parameter 1313 in FIG. 13 is represented by the floor (1F, 2F or 3F), the vertical axis (1, 2 or 3) and the horizontal axis (A, B or C). In FIG. 15, the location of the client 103 (or the server 102) is represented by a spot 1501, and #01 to #07 represent the order 1310 of the MFPs 104 in FIG. 13. In FIG. 15, the individual MFPs 104 can be easily located, and by viewing this screen, a client 103 can decide which MFP 104 to transmit data to.

<Data for Individual Devices>

When the cursor 1318 in FIG. 13, the cursor 1410 in FIG. 14 or the cursor 150 in FIG. 15 is clicked while pointing at a specific device in the corresponding window, the information for the selected device is displayed in FIG. 16. Although a plurality of devices are displayed in FIG. 16, when one device is selected, one window related to the device is displayed. In FIG. 16, the user can obtain the detailed parameters and apparatus data that are not completely displayed by the parameters in FIG. 13.

In addition, when the cursor is clicked while pointing at the button 1305 in FIG. 13, the button 1405 in FIG. 14 or the button 1505 in FIG. 15, detailed information of all or a part of the devices are simultaneously displayed, as is shown in FIG. 16.

<Status Tab>

Figure 18:
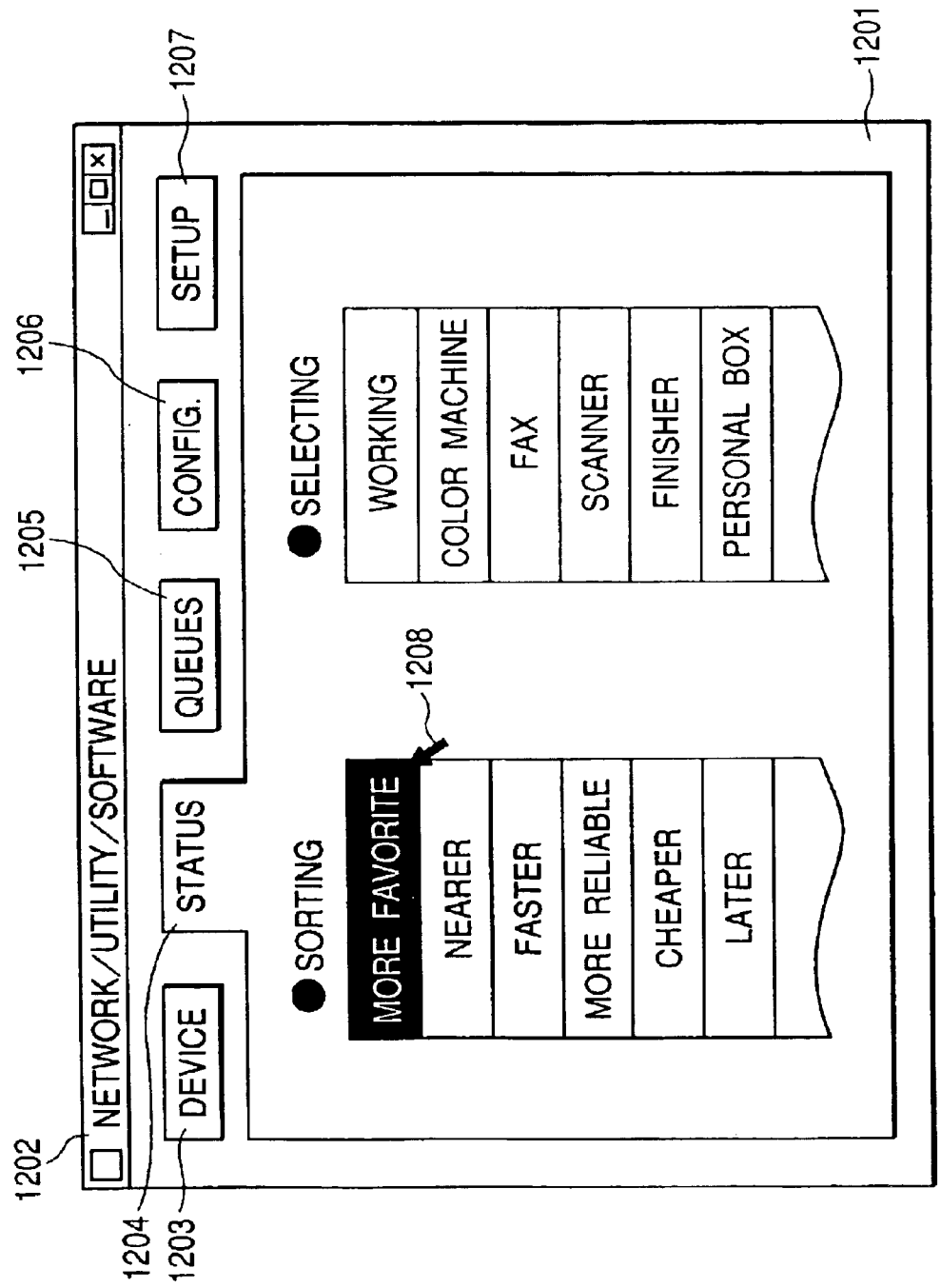
FIG. 18 is a diagram showing a status tab screen for the utility software.

When the status tab 1204 is clicked on, as in FIG. 13, a screen for sorting and selecting in FIG. 18 is displayed. When a desired sorting order ("More Favorite" in this example) is selected, the window is shifted to the one window in FIG. 19. In the window in FIG. 19, device names 1902 are displayed in order as desired by the client, accompanied with their corresponding statuses 1903. Thus enabling a user to determine, at the same time, whether the statuses of the individual devices indicate a paper jam or an error has occurred (1904), whether a maintenance man call has been issued (1905), and whether the power is on or off (1906). In addition, detailed data, such as the type of error and the location at which a paper jam occurred, can be displayed.

When a selecting parameter (Working) is selected, the window is shifted to the one window in FIG. 22. In that window, only the devices that are ready are selectively displayed.

Figure 20:
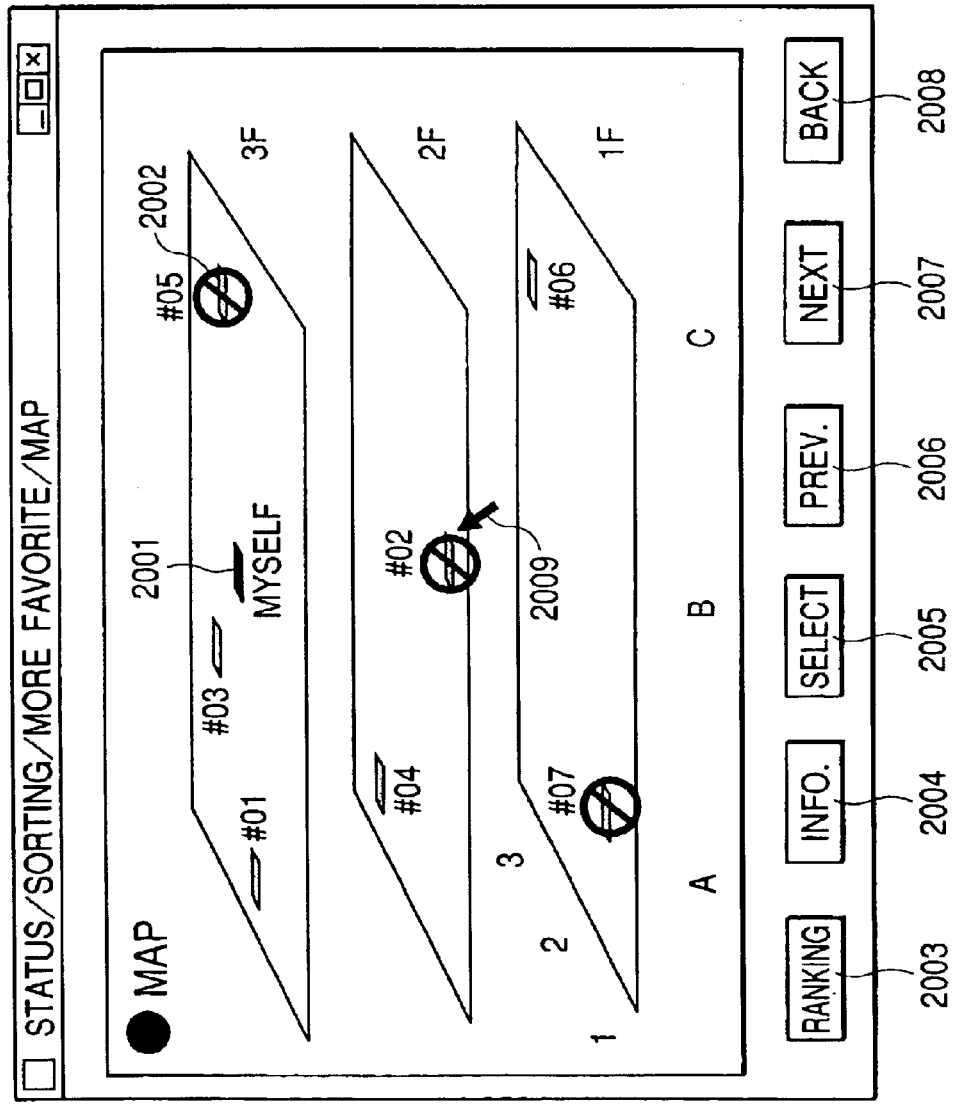
FIG. 20 is a diagram showing map screen 2 for the utility software.

When the map button in FIG. 19 is clicked as well as the device tab, the window is shifted to the one in FIG. 20. In this window, the devices that are ready and the locations at which the individual devices are installed are displayed. When a cursor 1907 in FIG. 19 or a cursor 2009 in FIG. 20 is moved to a specific device and clicked, detailed data for the selected device can be obtained, as is shown in FIG. 21. In the window in FIG. 21, whether or not the pertinent device is ready and, if the device is not ready, the reason that the pertinent device can not be employed (an error has occurred) are displayed.

<Queue Tab>

Figure 23:
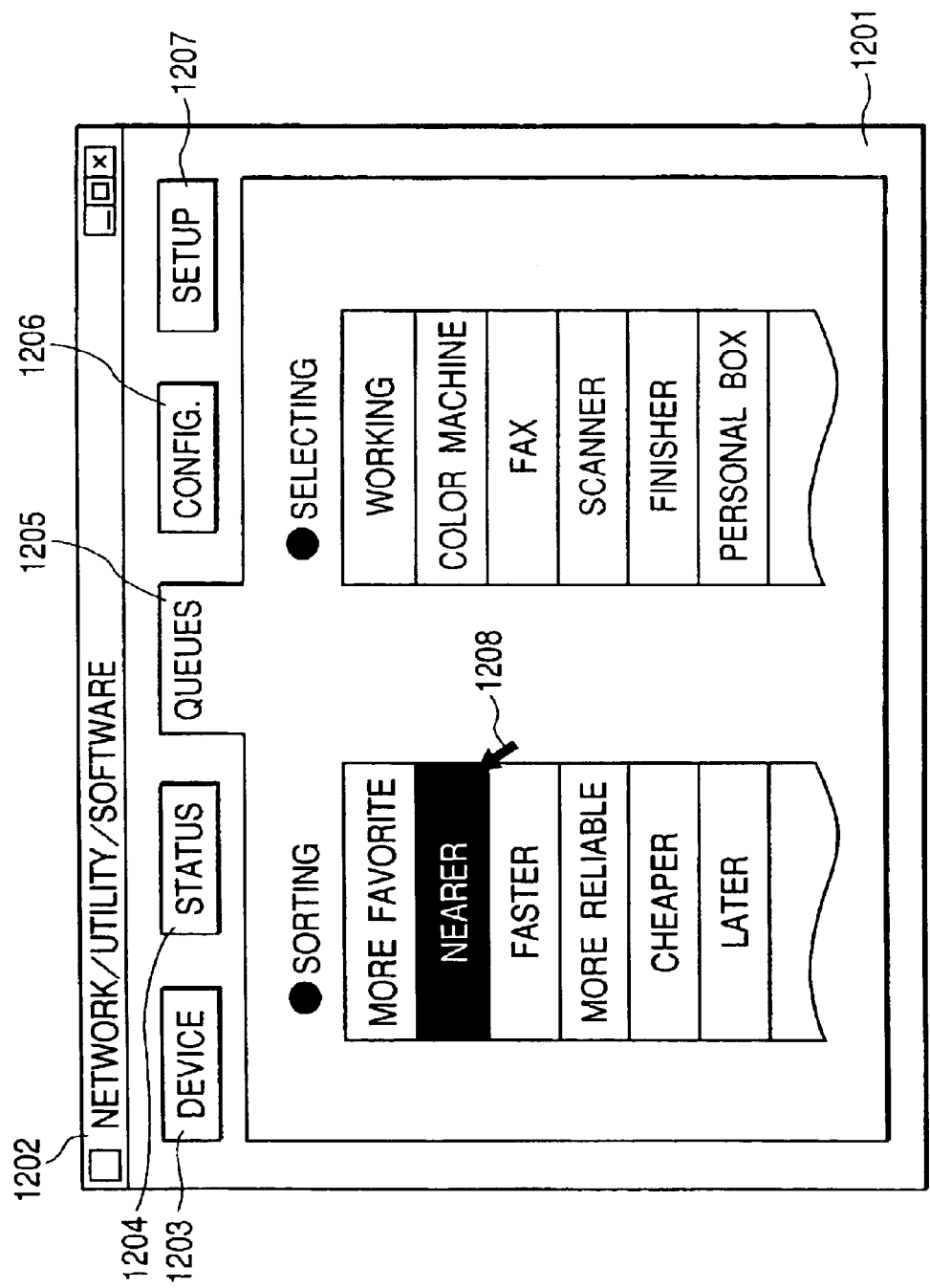
FIG. 23 is a diagram showing a queue tab screen for the utility software.

When the queue tab 1205 is clicked on, as in FIG. 13, a screen for sorting and selecting in FIG. 23 is displayed. Then, when the "Nearer" sorting order is selected, the window is shifted to the one in FIG. 24. In this window, the devices are ranked and displayed in order beginning with the one located nearest the client 103 (or the server 102). The nearer ranking includes: a device name 2402; a device status 2403; the number of pages 2404, which the client has requested be printed and are still queued for the RIP; the number of pages 2405, which are still queued for printing even though the RIP has been terminated; the number of pages 2406, which are in the printing wait state that applies when a device that has no buffer memory (normally provided for the hard disk) in which to hold a queue is employed for immediate printing; and a predicted waiting time 2407. When the predicted waiting time is "0" (e.g., london in FIG. 24), printing can be begun immediately. Thus, if a user desires the output results soon, he or she need only select a device having a predicted waiting time of 0, even though the device is not the one nearest the client distance. It should be noted that by requesting the display of the map screen in FIG. 25 the user can obtain the location of device #02:london in FIG. 24.

Figure 25:
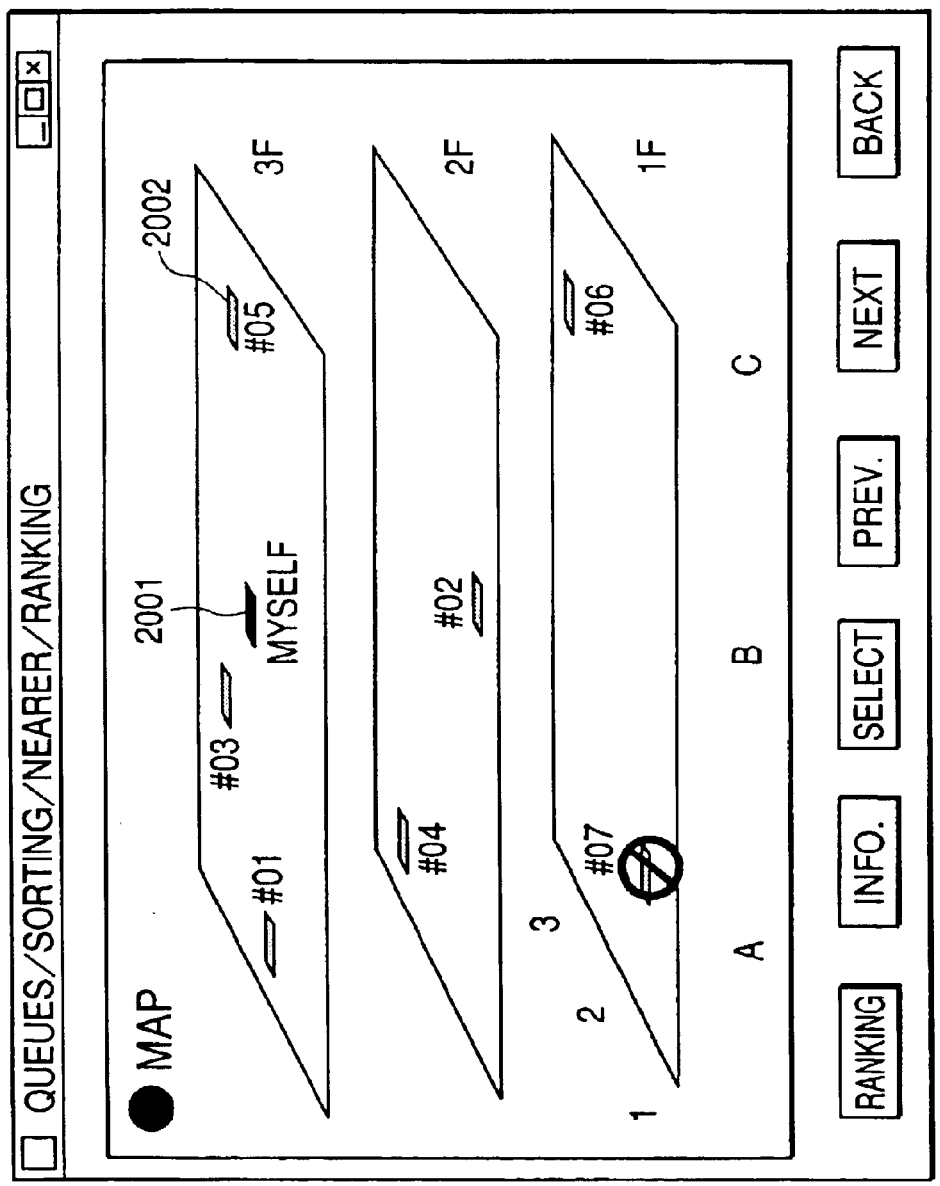
FIG. 25 is a diagram showing map screen 3 for the utility software.

A specific queue condition for each device can also be searched for. That is, when a desired device in FIG. 24 or 25 is selected by clicking on it, or when the information (Info.) button at the bottom of the window is selected, the window is shifted to the one in FIG. 26. In this window, the name of a client who transmitted a job, the number of pages in an RIP queue, the number of pages in a print queue, the number of pages in a direct queue, and the predicted waiting time for each queue process are displayed for jobs received by each device. Thus, the individual clients can obtain in advance the order for the jobs they have transmitted and the predicted waiting time for the jobs.

<Config. Tab>

Figure 27:
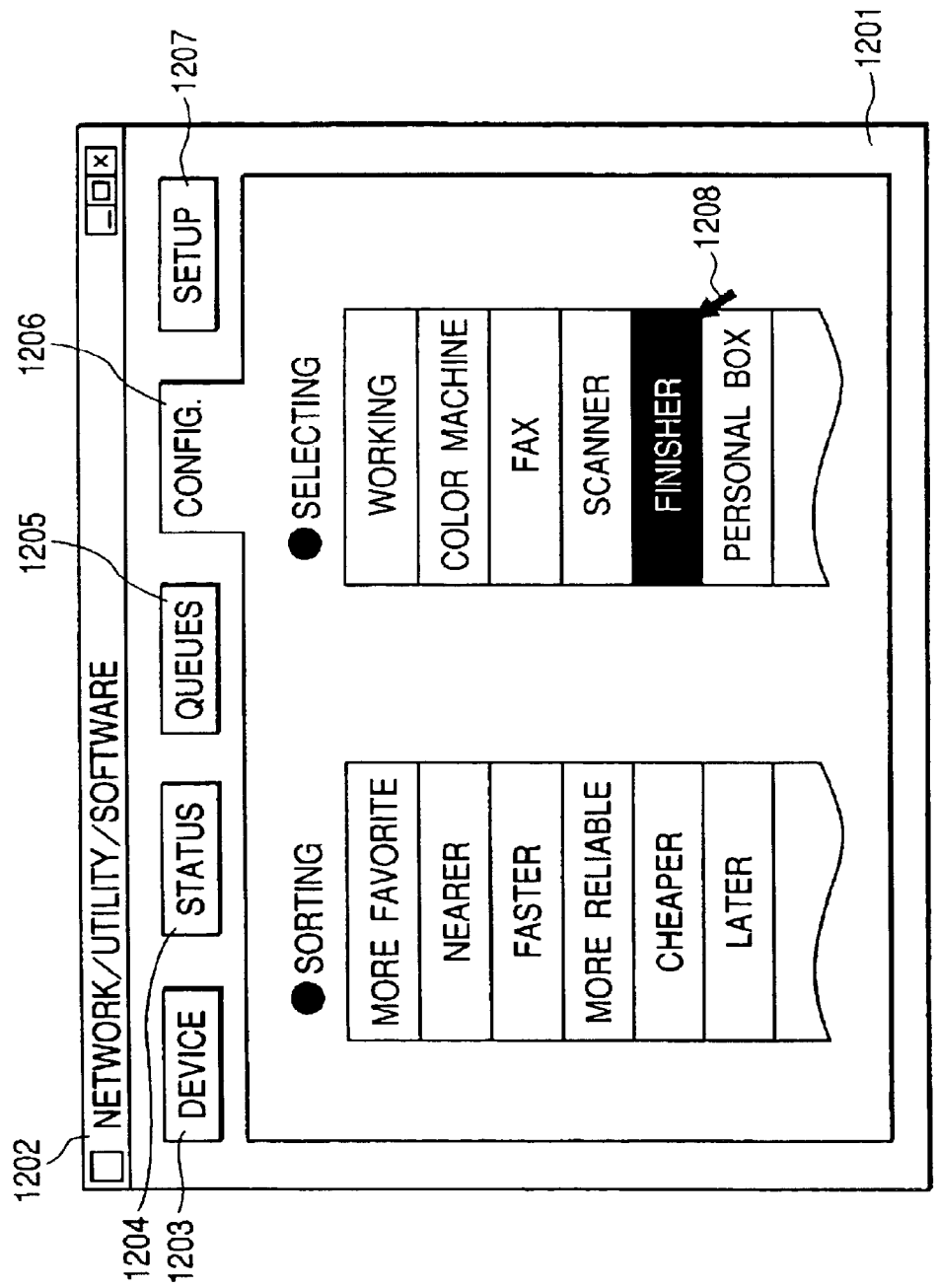
FIG. 27 is a diagram showing a configuration tab screen for the utility software.

When the configuration (Config.) tab 1206 is selected by clicking on it, the screen in FIG. 27 is displayed, and the user can obtain the equipment data for each device. For example, when the cursor 1208 is used to designate "Finisher" in the Selecting function, the window is shifted to the screen in FIG. 28. In this window are displayed device names 2802, and entries 2803 to 2810 that indicate whether various finisher functions are available at the individual devices. When, for example, a user desires to output data in the booklet mode, using the saddle stitch function 2808, he or she can select #02:shrimp.

<Setup Tab>

Figure 29:
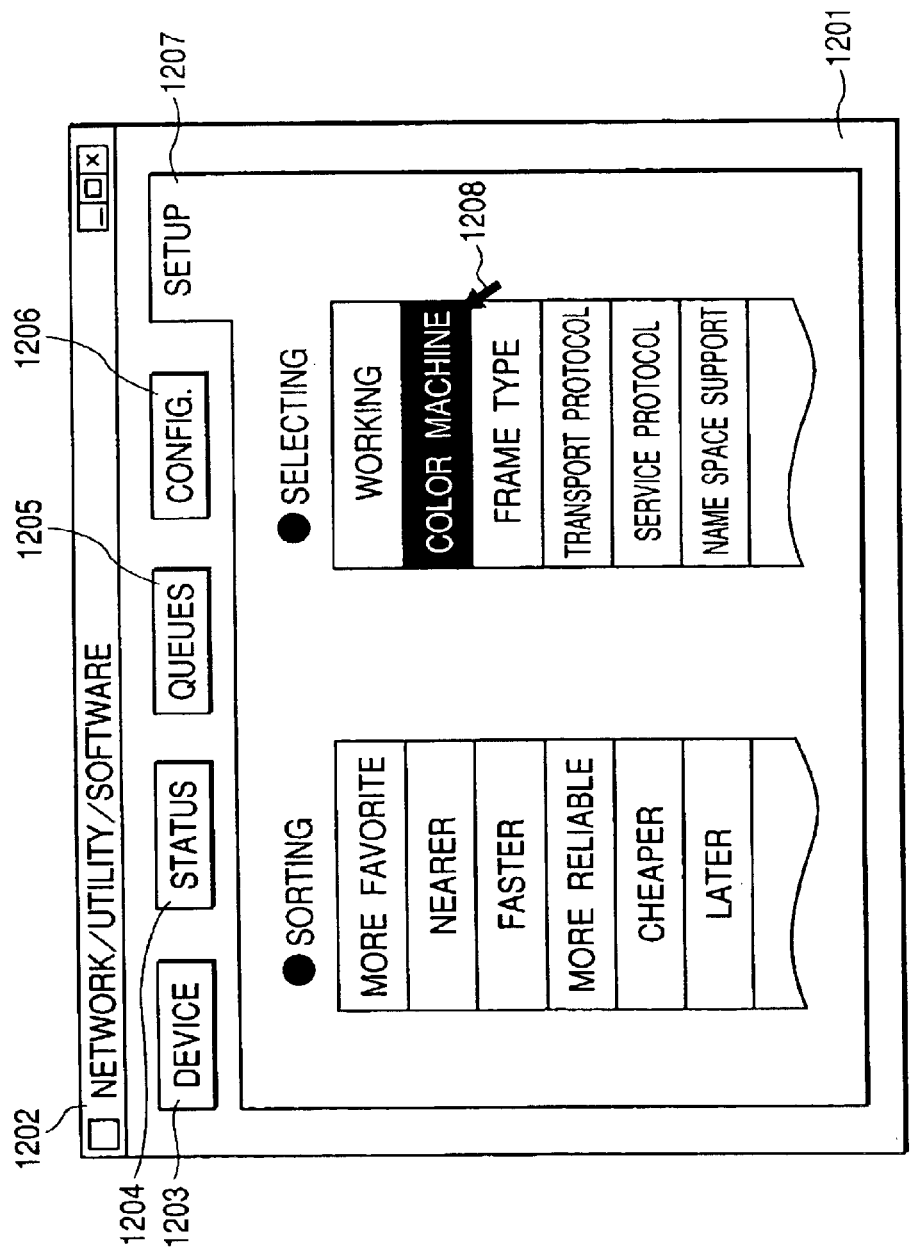
FIG. 29 is a diagram showing a setup tab screen for the utility software.

When the setup tab 1207 is selected by clicking on it, the screen in FIG. 29 is displayed, and the user can obtain the network setup data for each device. When, for example, the cursor 1208 is used to select "Media Type" in the Selecting function, the window is shifted to the one in FIG. 30. In this window are displayed device names 3002, and entries 3003 and 3004 that indicate the availability of various media type functions. When, for example, the client 103 or the server 102 includes an Ethernet network card for 100 Mbps and performs printing at a higher communication speed, a compatible 100 Mps device must be searched for on the network. In this case, a user need only examine the entries 3004 to select #01:eagle or #05:swan.

<Acquisition of Data for Network Utility>

Figure 32:
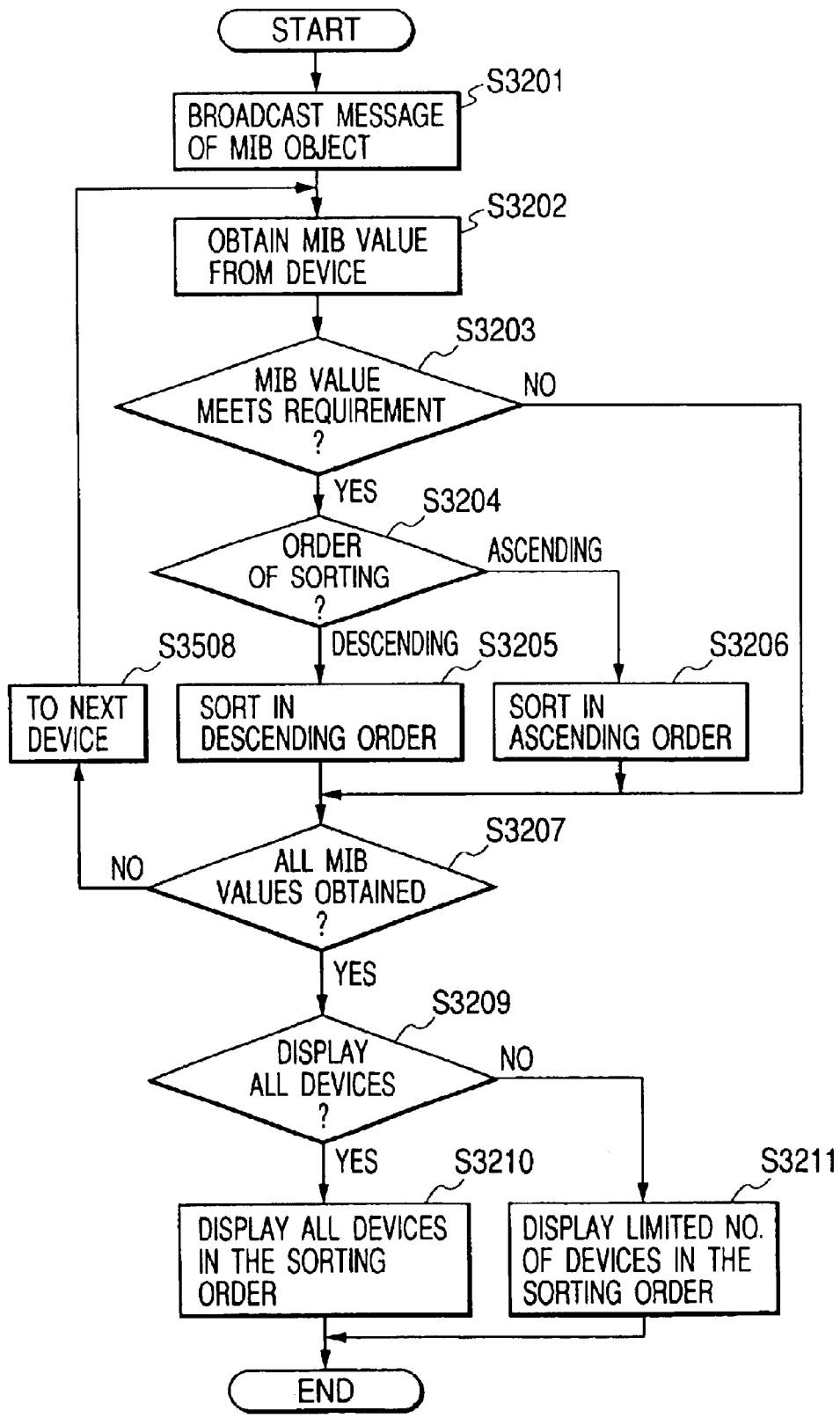
FIG. 32 is a flowchart showing the processing performed by the utility software.

FIG. 32 is a flowchart of the processing performed by the server 102 or the client 103b when using the MIB/SNMP to obtain necessary data from the individual MFPs 104.

When the network utility software is activated by the server 102 or the client 103b, a message is broadcast to obtain the value held for a required MIB object (step S3201), which is thereafter obtained from the devices (step S3202).

Then, a check is performed to determine whether each MIB value establishes a specific condition. This decision is made when the selecting function is employed. If, for example, the condition is that a device must have a speed equal to or higher than 30 PPM (Print Per Minute), at step S3201 a message requesting the print speed is issued, and at step S3202 the print speed of each device is obtained. Then, at step S3203, a Yes decision is obtained only for devices having a print speed equal to or higher than 30 PPM. Devices that do not satisfy the condition are not sorted, and data related to these devices are not displayed. When the selecting function is not employed, it is ascertained that the MIB values of all the devices satisfy the condition.

Following this, the sorting order is determined (step S3204). When the descending order is instructed by a user, the devices are sorted in the descending order (step S3205), or when the ascending order is instructed by the user, the devices are sorted in the ascending order (S3206). For sorting the devices, the MIB values obtained at step S3202 are employed.

Then a check is performed to determine whether all the MIB values have been obtained (step S3207). If there is an MIB value that has not yet been obtained, program control returns to S3202. When the MIB values of all the network devices have been obtained, the display operation is initiated, and a check is performed to determine whether all the devices are to be displayed in accordance with the setup that was determined in advance by the utility software (step S3209). If not all the devices are to be displayed, only the number of devices that was determined in advance are displayed in the sorting order. If all the devices are to be displayed, all the devices are displayed in the sorting order.

<Forming a Database in the Server>

In the system in FIG. 31, wherein messages are directly broadcast by clients, if there are multiple clients, communication traffic will become too heavy and will exceed the capabilities of the network. Therefore, in the system shown in FIG. 33, data from the individual devices is obtained only by the server 102, which prepares a database for the management of the obtained data.

Figure 33:
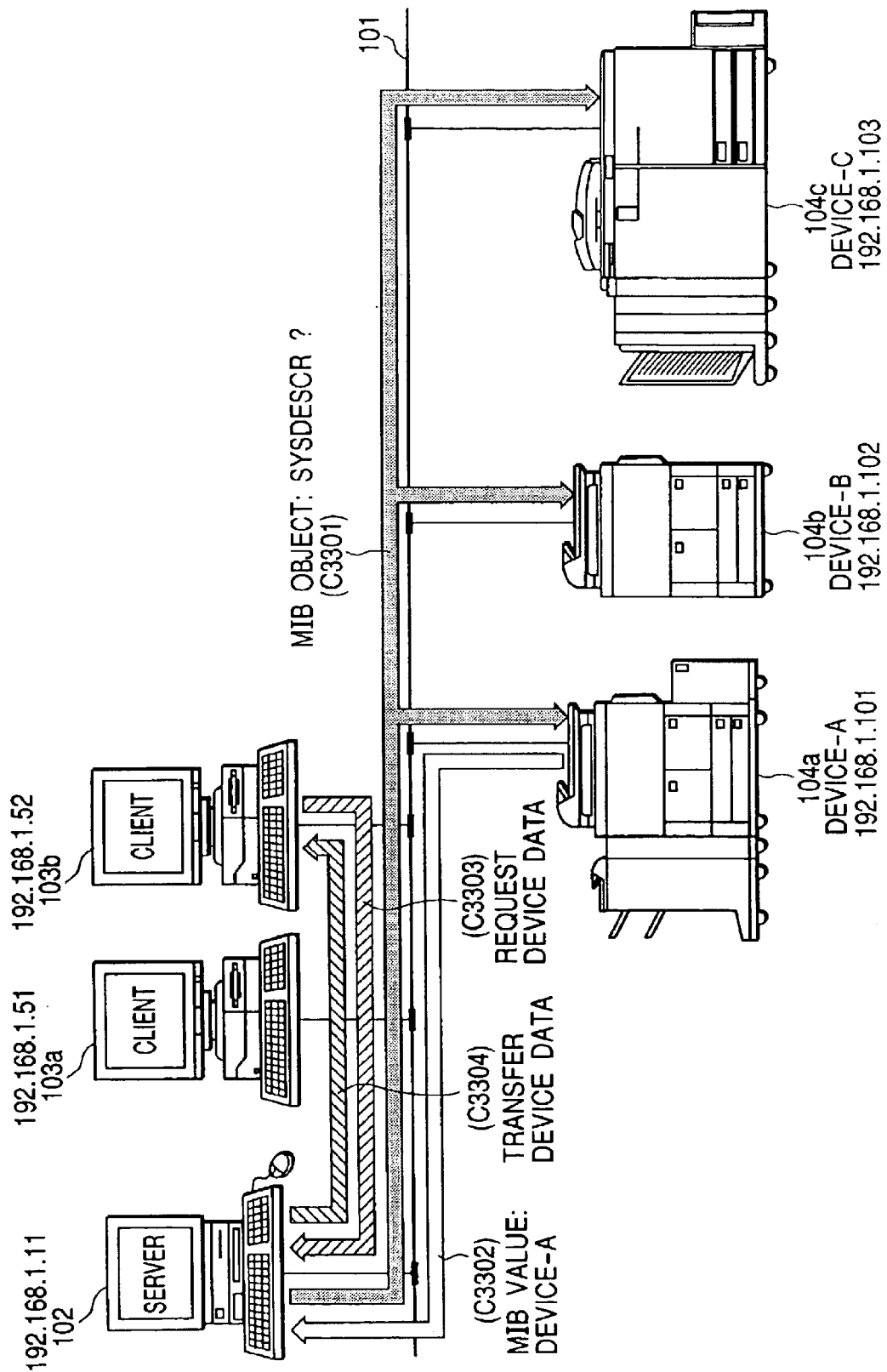
FIG. 33 is a diagram illustrating the exchange of data among a server, clients and image forming apparatuses.
Figure 34:
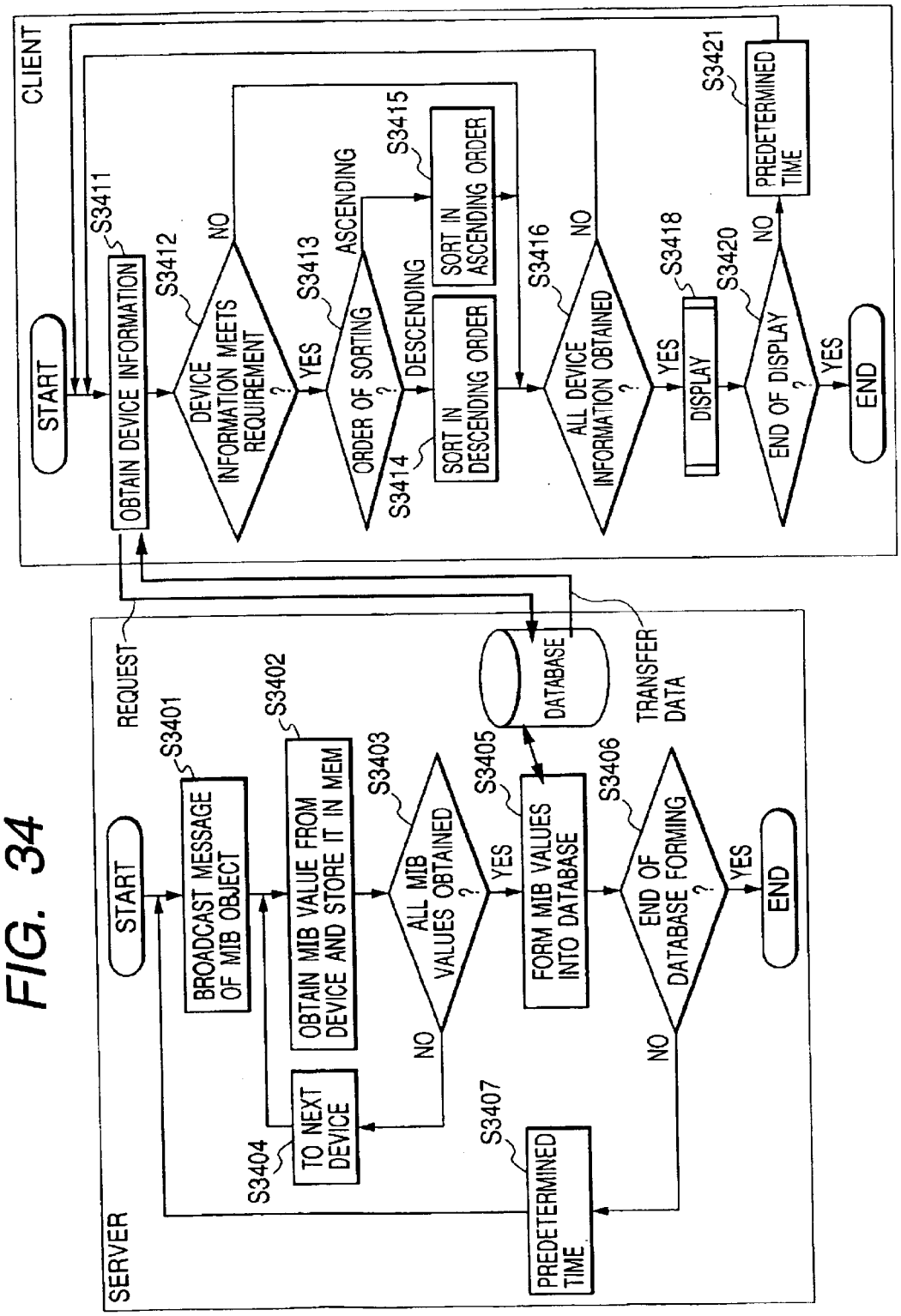
FIG. 34 is a flowchart showing the processing performed by the utility software.

The system in FIG. 33 will now be explained while referring to FIG. 34. FIG. 33 is a diagram showing the transmission of data when the server 102 obtains data from the MFPs 104 and transmits the data to the clients 103. FIG. 34 is a flowchart showing the operations performed by the server 102 and the clients 103.

First, the server 102 broadcasts a message C3301 to acquire values from a required MIB object (step S3401). Then, when the server 102 receives MIB values C3302 from the individual devices 104, it stores them in the internal memory (step S3402) and determines whether all of them have been obtained (S3403).

When MIB values have been received from all the devices, at step 3402 the server 102 stores the values in the memory in a database that it manages (step S3405). Following this a check is performed to determine whether the processing for forming a database should be terminated (step S3406). When this process is not terminated, the server 102 waits until a predetermined time has elapsed (step S3407) and program control returns to step S3401. This occurs because, since the data for the individual devices are changed as time passes, elapses, the contents of the database must be updated periodically.

Each of the clients 103 performs the following periodic processing to obtain data from the database of the server 102. First, the client 103 obtains, from the database, data for the devices (step S3411). Specifically, a client 103 transmits, to the server 102, a message C3303 requesting the device data that is desired. Then, the server 102 transmits to the client 103 a message C3304 for the transfer of the requested data.

Following this, a check is performed to determine whether the values of the individual device data satisfy a specific condition (step S3412). This decision is made when the selecting function is employed. Devices for which the data do not satisfy the condition are not sorted, and data for those devices are not displayed. When the selecting function is not employed, it is ascertained that the MIB values of all the devices satisfy the condition. Then, the sorting order is determined (step S3413). When the user designates the descending order, the devices are sorted in the descending order (S3414), and when the user designates the ascending order, the devices are sorted in the ascending order (step S3415). For sorting the devices, the device data values obtained at step S3411 are employed.

Figure 35:
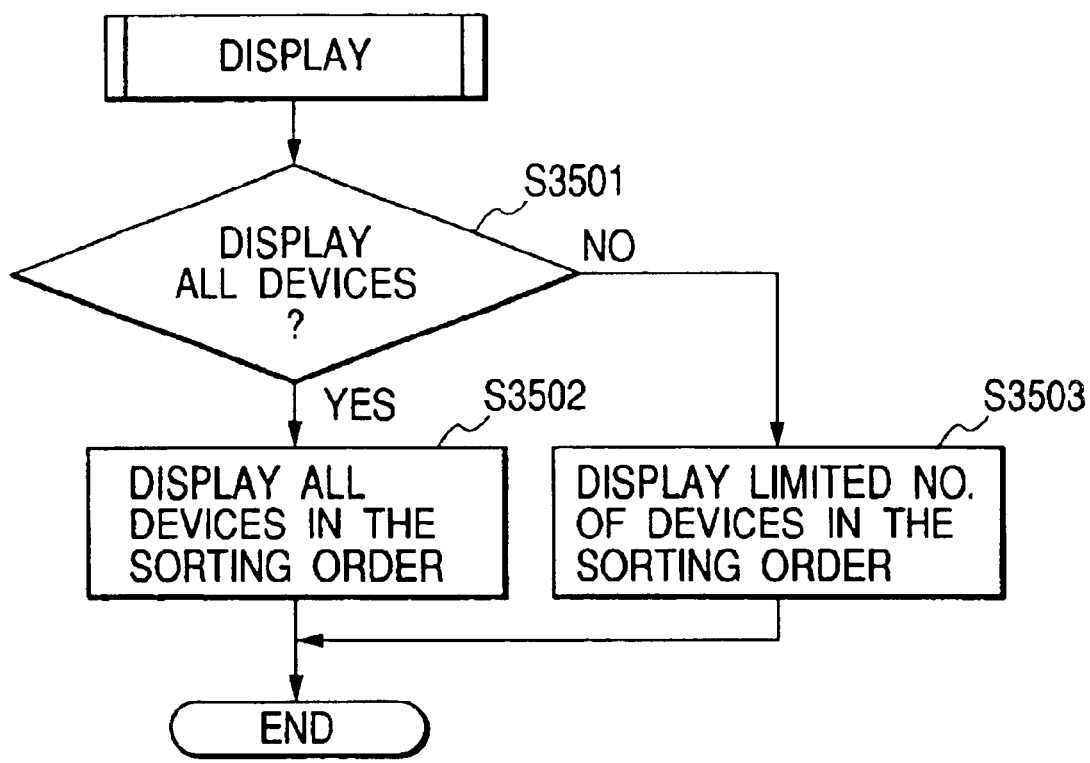
FIG. 35 is a flowchart showing the display processing.

A check is performed to determine whether all the device data have been obtained (step S3416). When there are device data that have not yet been obtained, program control returns to step S3411. When all the device data have been obtained, the display processing is initiated (step S3416), the flowchart for which is shown in FIG. 35. Finally, a check is performed to determine whether the display of the device data has ended (step S3420). When the display has not ended, the client 103 waits until a predetermined time has elapsed (step S3421) and program control returns to step S3411.

FIG. 35 is a flowchart showing the display processing. Whether all the devices are to be displayed is determined in accordance with the setup determined in advance by the utility software (step S3509). When not all of the devices are to be displayed, only the number of devices that was determined in advance are displayed in the sorting order (step S3502). When all the devices are selected for display, all the devices are sorted in the sorting order (step S3503).

<Other Embodiments>

The present invention may be applied to a system constituted by a plurality of apparatuses (e.g., a host computer, an interface device, a reader, a printer, etc.) or to a single apparatus (e.g., a copier, a facsimile machine, etc.).

Further, to achieve the objectives of the present invention, software program code for implementing functions of the above embodiments can be loaded into a computer (a CPU or an MPU) in an apparatus or in a system, and the program code can be read by the computer in the system or in the apparatus.

In this case, the program code accomplishes the functions of the above described embodiment, and a storage medium on which such program code is recorded constitutes the present invention.

A storage medium for supplying such program code can be, for example, a floppy disk, a hard disk, an optical disk, a magneto-optical disk, a CD-ROM, a CD-R, a magnetic tape, a nonvolatile memory card, or a ROM.

Figure 39:
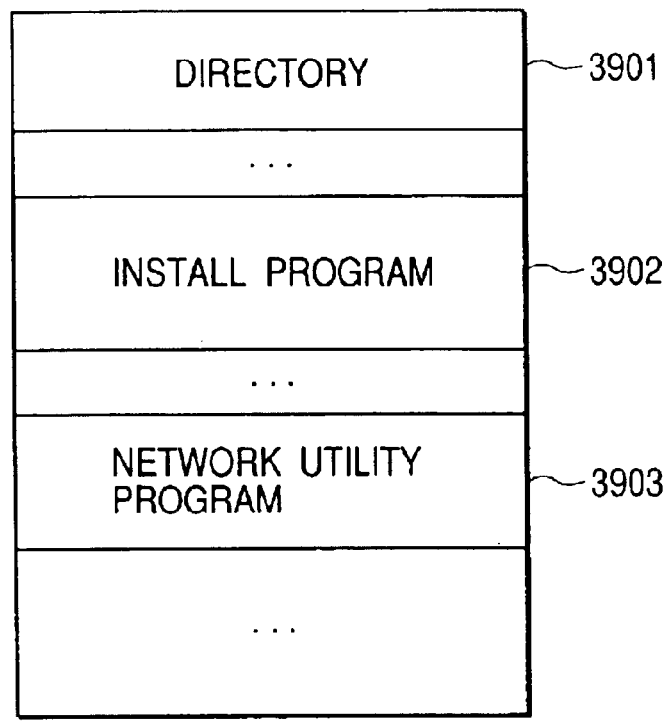
FIG. 39 is a diagram showing an example memory map.

FIG. 39 is a diagram showing an example memory map for a storage medium, such as a CD-ROM. An area 3901 is an area wherein directory information is stored, and indicates the location of an area 3902 wherein an installation program is stored and the location of an area 3903 wherein a network utility software program is stored. When the network utility software of the invention is to be installed in the host computer in FIG. 38, first, the installation program stored in the area 3902 is loaded into the system and is executed by the CPU 3801. Then, the installation program reads the network utility software program from the area 3903, and stores it on the hard disk 3811.

When the present invention is applied to the above storage medium, the program code that corresponds to the previously described flowcharts is stored on the storage medium.

Figure 40:
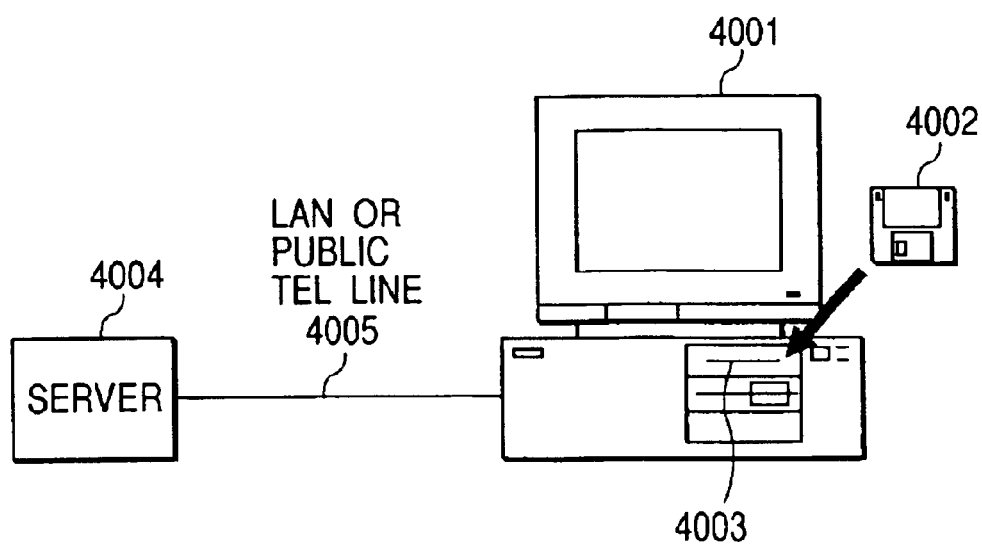
FIG. 40 is a diagram showing a method for supplying a program to an apparatus.

The present invention can also be applied in a case wherein software program code, from a storage medium, for implementing the functions of the above embodiment are distributed via a communication line between personal computers. Further, in order to implement the objectives of the present invention, as is shown in FIG. 40, the software program code for implementing the functions of the embodiment may be transmitted to an apparatus or a system 4001 by a server 4004, such as an HTTP server or an FTP server, via a network or public telephone 4005, or by radio, and a computer (or a CPU or an MPU) in the apparatus or in the system 4001 may execute the received program code.

In this case, the program code transmitted by the server 4004 accomplishes the functions of the above described embodiment, and the server 4004 that transmits the program code constitutes the present invention.

In addition, the present invention includes not only a case wherein the functions in the previous embodiment can be performed when program code is read and executed by the computer, but also a case wherein, in accordance with an instruction in the program code, an OS (Operating System) running on the computer performs a part, or all, of the actual processing in order to accomplish the functions in the above embodiment.

Furthermore, the present invention includes a case wherein program code, read from a storage medium, is written in a memory that is mounted on a function expansion board inserted into a computer, or in a function expansion unit connected to a computer, and in consonance with a program code instruction, a CPU mounted on the function expansion board or the function expansion unit performs a part, or all, of the actual processing in order to implement the functions in the above described embodiments.

As is described above, in the above embodiments, data for all or a part of the MFP devices connected to the network are obtained, and in accordance with various data, such as equipment data, the apparatus status, the network setup, the state of a job and the employment condition, the devices on the list are rearranged or limited, so that data desired by a user can be provided in real time.

Further, since the user can employ these data and can immediately find an MFP device that is suitable for his or her purpose, efficient and smooth device management can be provided for both the user and the entire network.

As is described above, according to the present invention, when a plurality of image forming apparatuses connected to a network are to be displayed on a list in accordance with the desire of each user, the image forming apparatuses can be rearranged in a desired order, or a desired image forming apparatus can be immediately searched for. In addition, the equipment data, the apparatus data, the network setup condition, the status of a job and the employment condition for a desired image forming apparatus can be provided in real time.

In addition, since GUIs in various forms, such as in a rank, in a graph or in a map, are provided for a user, usability can be improved.

What is claimed is:

1. A network system wherein a first information processing apparatus and a second information processing apparatus are connected via a network, comprising:

communication means, for communicating with a plurality of image processing apparatuses to obtain device data for said image processing apparatuses;

storage means, for storing the device data obtained with said communication means;

transmission means, for, following the receipt of a request from said second information processing apparatus, effecting transmission by said first information processing apparatus to said second information processing apparatus of the device data stored in said storage means;

request means, for issuing, to said first information processing apparatus by said second information processing apparatus, a request for the device data that are stored in said storage means; and display control means, for, based on the device data that are transmitted from said first information processing apparatus to said second information processing apparatus, arranging said plurality of image processing apparatuses, and for displaying corresponding device data on a display unit, wherein, to display the device data, said display control means assigns ranks for said image processing apparatuses based on a condition selected by a user.

2. A network system according to claim 1, wherein, to display the device data, said display control means arranges said image processing apparatuses in the descending order or in the ascending order of said ranks to which said image processing apparatuses have been assigned.

3. A network system according to claim 1, further comprising: condition selection means, for selecting one of a plurality of conditions, wherein, to display the device data, said display control means ranks said image processing apparatuses based on said condition selected by said condition selection means.

4. A network system according to claim 1, further comprising: apparatus selection means, for selecting one of said image processing apparatuses for which the device data are displayed by said display control means, wherein said display control means displays, on said display unit, device data for said image processing apparatus selected by said apparatus selection means.

5. A network system wherein a first information processing apparatus and a second information processing apparatus are connected via a network, comprising:

communication means, for communicating with a plurality of image processing apparatuses to obtain device data for said image processing apparatuses;

storage means, for storing the device data obtained with said communication means;

transmission means, for, following the receipt of a request from said second information processing apparatus, effecting transmission by said first information processing means to said second information processing means of the device data stored in said storage means;

request means, for the issuing to said first information processing apparatus of a request by said second information processing apparatus for the device data that are stored in said storage means; and display control means, for, based on the device data that are transmitted from said first information processing apparatus to said second information processing apparatus, arranging said plurality of image processing apparatuses, and for displaying corresponding device data on a display unit, wherein said display control means displays device data for only one part of said image processing apparatuses.

6. A network system according to claim 5, wherein said display control means displays device data only for image processing apparatuses that satisfy a condition selected by a user.

7. A network system according to claim 6, further comprising: condition selection means, for selecting one of a plurality of conditions, wherein said display control means displays device data only for image processing apparatuses that satisfy the condition that is selected by said condition selection means.

8. A network system according to claim 5, further comprising: apparatus selection means, for selecting one of said image processing apparatuses for which the device data are displayed by said display control means, wherein said display control means displays, on said display unit, device data for said image processing apparatus selected by said apparatus selection means.

9. An information processing method, for a network system wherein a first information processing apparatus and a second information processing apparatus are connected via a network, comprising:

a communication step, of communicating with a plurality of image processing apparatuses to obtain device data for the image processing apparatuses;

a storage step, of storing, in storage means, the device data obtained in said communication step;

a transmission step, of, following the receipt of a request from the second information processing apparatus, effecting transmission by the first information processing apparatus to the second information processing apparatus of the device data stored in the storage means;

a request step, of issuing, to the first information processing apparatus by the second information processing apparatus, a request for the device data that are stored in the storage means; and a display control step, of, based on the device data that are transmitted from the first information processing apparatus to the second information processing apparatus, arranging the plurality of image processing apparatuses, and of displaying corresponding device data on a display unit, wherein, in said display control step, to display the device data, ranks are assigned for the image processing apparatuses based on a condition selected by a user.

10. An information processing method according to claim 9, wherein, in said display control step, to display the device data, the image processing apparatuses are arranged in the descending order or in the ascending order of the ranks to which the image processing apparatuses have been assigned.

11. An information processing method according to claim 9, further comprising: a condition selection step, of selecting one of a plurality of conditions, wherein, in said display control step, to display the device data, the image processing apparatuses are ranked based on the condition selected in said condition selection step.

12. An information processing method according to claim 9, further comprising: an apparatus selection step, of selecting one of the image processing apparatuses for which the device data are displayed in said display control step, wherein, in said display control step, device data for the image processing apparatus selected in said apparatus selection step are displayed on the display unit.

13. An information processing method, for a network system wherein a first information processing apparatus and a second information processing apparatus are connected via a network, comprising:

a communication step, of communicating with a plurality of image processing apparatuses to obtain device data for the image processing apparatuses;

a storage step, of storing, in storage means, the device data obtained in said communication step;

a transmission step, of, following the receipt of a request from the second information processing apparatus, effecting transmission by the first information processing apparatus to the second information processing apparatus of the device data stored in the storage means;

a request step, of issuing, to the first information processing apparatus by the second information processing apparatus, a request for the device data that are stored in the storage means; and a display control step, of, based on the device data that are transmitted from the first information processing apparatus to the second information processing apparatus, arranging the plurality of image processing apparatuses, and of displaying corresponding device data on a display unit, wherein, in said display control step, device data are displayed for only one part of the image processing apparatuses.

14. An information processing method according to claim 13, wherein, in said display control step, device data are displayed only for image processing apparatuses that satisfy a condition selected by a user.

15. An information processing method according to claim 14, further comprising: a condition selection step, of selecting one of a plurality of conditions, wherein, in said display control step, device data are displayed only for image processing apparatuses that satisfy the condition that is selected in said condition selection step.

16. An information processing method according to claim 13, further comprising: an apparatus selection step, of selecting one of the image processing apparatuses for which the device data are displayed in said display control step, wherein, in said display control step, device data for the image processing apparatus selected at the apparatus selection means are displayed on the display unit.

17. A computer-readable memory medium which stores an information processing program executed by a network system wherein a first information processing apparatus and a second information processing apparatus are connected via a network, said information processing program comprising:

a communication step, of communicating with a plurality of image processing apparatuses to obtain device data for the image processing apparatuses;

a storage step, of storing, in storage means, the device data obtained in said communication step;

a transmission step, of, following the receipt of a request from the second information processing apparatus, effecting transmission by the first information processing apparatus to the second information processing apparatus of the device data stored in the storage means;

a request step, of issuing, to the first information processing apparatus by the second information processing apparatus, a request for the device data that are stored in the storage means; and a display control step, of, based on the device data that are transmitted from the first information processing apparatus to the second information processing apparatus, arranging the plurality of image processing apparatuses, and of displaying corresponding device data on a display unit, wherein, in said display control step, to display the device data, ranks are assigned for the image processing apparatuses based on a condition selected by a user.

18. A computer-readable memory medium according to claim 17, wherein, in said display control step, to display the device data, the image processing apparatuses are arranged in the descending order or in the ascending order of the ranks to which the image processing apparatuses have been assigned.

19. A computer-readable memory medium according to claim 17, wherein said information processing program further comprises a condition selection step, of selecting one of a plurality of conditions, wherein, in said display control step, to display the device data, the image processing apparatuses are ranked based on the condition selected in said condition selection step.

20. A computer-readable memory medium according to claim 17, wherein said information processing program further comprises an apparatus selection step, of selecting one of the image processing apparatuses for which the device data are displayed in said display control step, wherein, in said display control step, device data for the image processing apparatus selected at said apparatus selection step are displayed on the display unit.

21. A computer-readable memory medium which stores an information processing program executed by a network system wherein a first information processing apparatus and a second information processing apparatus are connected via a network, said information processing program comprising:

a communication step, of communicating with a plurality of image processing apparatuses to obtain device data for the image processing apparatuses;

a storage step, of storing, in storage means, the device data obtained in said communication step;

a transmission step, of, following the receipt of a request from the second information processing apparatus, effecting transmission by the first information processing apparatus to the second information processing apparatus of the device data stored in the storage means;

a request step, of issuing, to the first information processing apparatus by the second information processing apparatus, a request for the device data that are stored in the storage means; and a display control step, of, based on the device data that are transmitted from the first information processing apparatus to the second information processing apparatus, arranging the plurality of image processing apparatuses, and of displaying corresponding device data on a display unit, wherein, in said display control step, device data are displayed for only one part of the image processing apparatuses.

22. A computer-readable memory medium according to claim 21, wherein, in said display control step, device data are displayed only for image processing apparatuses that satisfy a condition selected by a user.

23. A computer-readable memory medium according to claim 22, wherein said information processing program further comprises a condition selection step, of selecting one of a plurality of conditions, wherein, in said display control step, device data are displayed only for image processing apparatuses that satisfy the condition that is selected in said condition selection step.

24. A computer-readable memory medium according to claim 21, wherein said information processing program further comprises an apparatus selection step, of selecting one of the image processing apparatuses for which the device data are displayed in said display control step, wherein, in said display control step, device data for the image processing apparatus selected in said apparatus selection step are displayed on the display unit.

25. An information processing program executed by a network system wherein a first information processing apparatus and a second information processing apparatus are connected via a network, comprising:

a communication step, of communicating with a plurality of image processing apparatuses to obtain device data for the image processing apparatuses;

a storage step, of storing, in storage means, the device data obtained in said communication step;

a transmission step, of, following the receipt of a request from the second information processing apparatus, effecting transmission by the first information processing apparatus to the second information processing apparatus of the device data stored in the storage means;

a request step, of issuing, to the first information processing apparatus by the second information processing apparatus, a request for the device data that are stored in the storage means; and a display control step, of, based on the device data that are transmitted from the first information processing apparatus to the second information processing apparatus, arranging the plurality of image processing apparatuses, and of displaying corresponding device data on a display unit, wherein, in said display control step, to display the device data, ranks are assigned for the image processing apparatuses based on a condition selected by a user.

26. An information processing program according to claim 25, wherein, in said display control step, to display the device data, the image processing apparatuses are arranged in the descending order or in the ascending order of the ranks to which the image processing apparatuses have been assigned.

27. An information processing program according to claim 25, further comprising a condition selection step, of selecting one of a plurality of conditions, wherein, in said display control step, to display the device data, the image processing apparatuses are ranked based on the condition selected in said condition selection step.

28. An information processing program according to claim 25, further comprising an apparatus selection step, of selecting one of the image processing apparatuses for which the device data are displayed in said display control step, wherein, in said display control step, device data for the image processing apparatus selected in said apparatus selection step are displayed on the display unit.

29. An information processing program executed by a network system wherein a first information processing apparatus and a second information processing apparatus are connected via a network, comprising:
 a communication step, of communicating with a plurality of image processing apparatuses to obtain device data for the image processing apparatuses;
 a storage step, of storing, in storage means, the device data obtained in said communication step;
 a transmission step, of, following the receipt of a request from the second information processing apparatus, effecting transmission by the first information processing apparatus to the second information processing apparatus of the device data stored in the storage means;
 a request step, of issuing, to the first information processing apparatus by the second information processing apparatus, a request for the device data that are stored in the storage means; and
 a display control step, of, based on the device data that are transmitted from the first information processing apparatus to the second information processing apparatus, arranging the plurality of image processing apparatuses, and of displaying corresponding device data on a display unit,
 wherein, in said display control step, device data are displayed for only one part of the image processing apparatuses.

30. An information processing program according to claim 29, wherein, in said display control step, device data are displayed only for image processing apparatuses that satisfy a condition selected by a user.

31. An information processing program according to claim 30, wherein said information processing program further comprises a condition selection step, of selecting one of a plurality of conditions, wherein, in said display control step, device data are displayed only for image processing apparatuses that satisfy the condition that is selected in said condition selection step.

32. An information processing program according to claim 29, further comprising an apparatus selection step, of selecting one of the image processing apparatuses for which the device data are displayed in said display control step, wherein, in said display control step, device data for the image processing apparatus selected in said apparatus selection step are displayed on the display unit.

33. An information processing apparatus provided with a communication interface unit that is capable of communicating with a plurality of image processing apparatuses and with an external information processing apparatus having a display unit, said information processing apparatus comprising:

a communication unit, adapted to communicate with the plurality of image processing apparatuses via the communication interface to obtain device data for the plurality of image processing apparatuses;
 storage, adapted to store the device data obtained by said communication unit; and
 a transmission unit, adapted to transmit the device data stored in said storage to the external information processing apparatus in response to a request from the external information processing apparatus,
 wherein the external information processing apparatus assigns ranks for the plurality of image processing apparatuses based on the device data transmitted by said transmission unit and on a condition entered externally, and displays the device data with the assigned ranks on the display unit.

34. An information processing method for use in an information processing apparatus that is provided with a communication interface unit that is capable of communicating with a plurality of image processing apparatuses and with an external information processing apparatus having a display unit, said information processing method comprising the steps of:
 communicating with the plurality of image processing apparatuses via the communication interface to obtain device data for the plurality of image processing apparatuses;
 storing the device data obtained in said communicating step; and
 transmitting the device data stored in said storing step to the external information processing apparatus in response to a request from the external information processing apparatus,
 wherein the external information processing apparatus assigns ranks for the plurality of image processing apparatuses based on the device data transmitted in said transmitting step and on a condition entered externally, and displays the device data with the assigned ranks on the display unit.

35. A computer-readable memory medium storing executable instructions for performing an information processing method for use with an information processing apparatus that is provided with a communication interface unit that is capable of communicating with a plurality of image processing apparatuses and with an external information processing apparatus having a display unit, said information processing method comprising the steps of:
 communicating with the plurality of image processing apparatuses via the communication interface to obtain device data for the plurality of image processing apparatuses;
 storing the device data obtained in said communicating step; and
 transmitting the device data stored in said storing step to the external information processing apparatus in response to a request from the external information processing apparatus,
 wherein the external information processing apparatus assigns ranks for the plurality of image processing apparatuses based on the device data transmitted in said transmitting step and on a condition entered externally, and displays the device data with the assigned ranks on the display unit.

* * * * *